United States Patent
Nussbaumer

[11] 4,025,719
[45] May 24, 1977

[54] PHASE-DIRECTED DECISION FEEDBACK EQUALIZER

[75] Inventor: Henri Nussbaumer, LaGaude, France

[73] Assignee: International Business Machines Corporation, Armonk, N.Y.

[22] Filed: Jan. 15, 1976

[21] Appl. No.: 649,300

[30] Foreign Application Priority Data

Feb. 21, 1975 France .................... 75.05906

[52] U.S. Cl. .................... 178/67; 325/42
[51] Int. Cl.² .................... H04L 27/18
[58] Field of Search ............ 178/67, 69 R; 325/42, 325/321, 30, 320, 323; 328/133, 162, 165, 166; 333/18

[56] References Cited
UNITED STATES PATENTS

| | | | |
|---|---|---|---|
| 3,539,930 | 11/1970 | Strole | 328/166 |
| 3,943,468 | 3/1976 | Cox et al. | 333/18 |
| 3,947,768 | 3/1976 | Desblanche et al. | 333/18 X |
| 3,963,990 | 6/1976 | DiFonzo | 328/166 X |
| 3,965,433 | 6/1976 | Yeh | 333/18 X |

*Primary Examiner*—Benedict V. Safourek
*Attorney, Agent, or Firm*—Delbert C. Thomas

[57] ABSTRACT

A decision feedback equalizer is described wherein an approximate value $\alpha_0$ of the phase of the signal being received at sampling time $t_0$ is obtained by subtracting a phase error $(\theta_0 - \alpha_0)$ from the value $\theta_0$ of the phase of the signal received at $t_0$. Value $\Delta_0$ is fed to a decision logic which provides an estimated value $\hat{\Delta}_0$ of the phase of the transmitted signal, which value is representative of the detected data. Value $\alpha_0$ is fed to a decoder which provides its components in a Cartesian coordinates system. These components are fed to the inputs of a complex, cross-coupled equalizer which supplies the approximate values $\Delta u_0$ and $\Delta v_0$ of the components, in a Cartesian coordinates system, of the distorting signal representative of all distortions introduced by the communication channel. The phase error $(\theta_0 - \alpha_0)$ is obtained from the relation $$\sin(\theta_0 - \tilde{\alpha}_0) = \tilde{\Delta} u_0 \cos \theta_0 - \tilde{\Delta} u_0 \sin \theta_0.$$

The proposed decision feedback equalizer is made adaptive by adjusting the values of the coefficients of the complex equalizer to cause $\alpha_0$ to approximate as nearly as possible the value $\alpha_0$ of the signal transmitted at sampling time $t_0$.

12 Claims, 8 Drawing Figures

COMMUNICATION CHANNEL MODEL

PHASE-DIRECTED DECISION FEEDBACK EQUALIZER

DETAILED DESCRIPTION

This invention relates to systems designed to compensate for the linear distortions introduced into signals by the communication channels of digital data communication systems, and, more particularly, to a decision feedback equalizer for a digital data communication system using the digital phase modulation technique.

In digital data communication systems, the sequence of data bits to be transmitted is first converted into a sequence of symbols each of which may assume a discrete number of values which is generally equal to a power of two. These symbols are then transmitted at a given rate over a communication channel in the form of pulses which may or may not be modulated depending on whether or not the communication system uses the carrier modulation method. The function of the channel is to provide an output signal fairly similar to the input signal applied thereto. In practice, such channels normally introduce some amplitude and phase distortions which modify the shape of the transmitted signals and such distortion may preclude reliable detection of the distorted received signals by the receiver.

These distortions are generally due to the non-linear transfer characteristics of the communication channels and the distortions are aggravated by the noise introduced into the channel by external sources which may be more or less difficult to shield. The amplitude and phase distortions of a channel can create an interaction between successive signals in the channel if the signal spacing is less than a critical value. This interaction is known as intersymbol interference. Thus, a pulse applied to the input of the communication channel appears at the output thereof, to which the receiver is connected, as a main pulse preceded and/or followed by a number of secondary pulses, or side lobes, of smaller amplitude. The side lobes which precede the main pulse are generally called "leading or precursor lobes" while those which follow it are referred to as "lagging lobes". If pulses representative of the data are applied to the input of the communication channel every T seconds and if the duration of the leading and lagging lobes introduced by the channel exceeds T seconds, these lobes will combine with the main pulses of adjacent symbols so that the data will be incorrectly detected by the receiver.

One way of overcoming this difficulty is to provide between successive signals a time interval sufficiently long to preclude any possible interferences between the pulses as distorted by the channel. Obviously, the effect of this will be to reduce the data transmission rate.

OBJECTS OF THE INVENTION

In high-speed data communication systems, various techniques are used to compensate for the effects of intersymbol interference.

One of these techniques consists in causing the data signals to be predistorted at the transmitting side in such a way that, as modified by the distortions introduced by the communication channel, the predistorted signals obtained at the receiving end will have the desired shape. The use of this technique is limited to those installations where the characteristics of the channel are known and constant.

Another technique, which is utilized where the channel characteristics are unknown, consists in providing the receiver with a device designed to minimize the effects of the symbol interference before the data are detected. Such a device is called an equalizer.

A first class of equalizers includes the so-called bump equalizers, which operate in the frequency domain and are described, for example, in an article entitled, "Equalizing the Main Station Repeaters", by F. C. Kelcourse et al, in the Bell Technical Journal, Vol. 48, No. 4, April, 1969. Generally, a bump equalizer comprises a number of corrective networks which are connected in series and can be individually adjusted. Ideally, the frequency response curve of each of these networks is constant throughout the operation bandwidth of the system, with the exception of a relatively narrow frequency band called useful band in which the amplitude of the response curve is adjustable. The use of different networks whose useful bands are distributed throughout the bandwidth of the system permits any distortion introduced by the channel to be corrected by making suitable adjustments of one or more of the networks. The bump equalizers, the adjustment of which is a tedious and time-consuming process, are mainly used in conjunction with fixed communication channels whose changes in characteristics are largely due to temperature variations and to the aging of components. Accordingly, these equalizers are principally utilized in the repeaters of communication systems wherein the communication channel is comprised of coaxial cables.

A second class of equalizers includes the automatic adaptive equalizers which operate in the time domain. These devices are described in many publications such as "Principles of Data Communication", by R. W. Lucky, J. Salz and E. J. Waldon, Jr., chapter 6, McGraw-Hill, New York, 1968, and in the references cited in the latter work. In general, such an equalizer consists of a network whose variable transfer function is adjusted as a function of an error signal obtained by comparing the equalizer output signal with a reference signal.

This second class further includes the transversal equalizers and the recursive equalizers which are so named because the above-mentioned network is comprised of a transversal filter or of a recursive filter, respectively. The most widely used of these equalizers is the automatic transversal equalizer described, for example, in the book by R. W. Lucky et al cited above. This device essentially consists of a transversal filter to the input of which the received signal is applied. As is known, the transversal filter is comprised of a delay line tapped at T-second intervals, with 1/T being the symbol transmission rate. Each tap along the delay line is connected through a weighting circuit to one of the inputs of a summing device whose output represents the output of the equalizer. To optimize the equalization, the weighting coefficients are adjusted so as to minimize a given error criterion in accordance with a given algorithm. The transversal equalizer has proved highly effective in compensating for the effects of the leading lobes of the distorted signal. On the other hand, this equalizer noticeably reduces the signal-to-noise ratio, which may not be particularly troublesome if the communication channels introduce little or no noise, but will result in a marked increase in the number of data detection errors in the case of channels such as telephone lines which introduce a considerable amount of noise. To overcome this difficulty, two solutions have been proposed. One of these is to increase the length of the delay line associated with the transversal equalizer, but this solution had the disadvantage that it increases the number of components and computations as well as the time interval required to adjust the weighting coefficients. The second solution calls for the use of a recursive equalizer rather than a transversal equalizer.

The recursive equalizer is described, in particular, in an article entitled "ADEM, An Automatically Data Equalized Modem for High Speed Transmission", by R. A. Northrup, D. M. Motley and O. C. Morgan, in IEEE Computers and Communications Conference Record, Rome, N. Y., September, 1969, pages 44–45, and in an article entiled, "Recursive Equalization in Data Transmission — A Design Procedure and Performance Evaluation," by S. M. Fitch and L. Kurz, in Sixth Asilomar Conference on Circuits and Systems, Pacific Grove, Calif, November, 1972, pages 386–390. This type of equalizer comprises a transversal portion similar to a transversal equalizer, to the output of which a purely recursive portion is connected. The latter portion comprises a delay line tapped at T-sec. intervals, each tap being connected through a weighting circuit to one of the inputs of a summing device. The output of the summing device is connected to a subtractor which subtracts the signal provided by the summing device from the signal obtained at the output of the transversal portion. The output of the subtractor is applied to the input of the delay line in the purely recursive portion and, in addition, constitutes the output of the recursive equalizer. The equalization is optimized by adjusting the values of the weighting coefficients. The structure of such a recursive equalizer is no more complex than that of a transversal equalizer. As stated in the above-mentioned article by S. M. Fitch et al, the performance of a recursive equalizer with a total of 5 taps (for both the transversal and purely recursive portions) is better than that of a 17-tap transversal equalizer for signal-to-noise ratios lower than about 17dB. The performance of the recursive equalizer has been improved by interposing a decision logic between the output of the subtractor and the input of the delay line in the recursive portion. The function of this decision logic is to compare the signal provided by the subtractor with a number of reference signals and to select from the latter a signal that will be considered the detected signal. Such equalizers are known as "decision feedback equalizers" and are described in many publications. Reference is made, in particular to the following articles:

"A New Approach to Time-Domain Equalization with Simplified Procedures," by E. Gorog, in IBM Journal of Research and Development, Vol. 9, July, 1965, pages 228–232;

"An Adaptive Decision Feedback Equalizer," by R. R. Bower, D. A. George and J. R. Storey, in International Conference on Communications, June 1970, pages 16-18 to 16-24;

"Equalization for Digital Communication," by B. Wendland, in IEEE Eurocom, Lausanne, August 1971, pages 1–24;

"Non Linearly Feedback-Equalized PAM vs. Capacity for Noisy Filter Channels," by R. Price, in 1972 International Conference on Communications, June, 1972, pages 22-12 to 22-17; and "Theory for Minimum Mean-Square-Error QAM Systems Employing Decision Feedback Equalization," by D. D. Falconer and G. J. Foschini, in the Bell System Technical Journal, December 1973, pages 1821–1849.

In summary, a transversal equalizer should preferably be used where the distorted signal takes the form of a main pulse preceded by leading lobes; a decision feedback equalizer comprising both a transversal portion and a recursive portion should be used where the distorted signal takes the form of a main pulse with both leading and lagging lobes; and a decision feedback equalizer comprising only a recursive portion should be used where the distorted signal consists of a main pulse followed by lagging lobes.

The automatic adaptive equalizers which operate in the time domain, whether they use a transversal filter or a recursive filter, perform the equalization of the communication channel by correcting the shape of the received signal. Thus, all known equalizers that operate in the time domain use the received signal, or the in-phase and quadrature components thereof, as input signal.

In those digital data communication systems which use a digital phase modulation technique, also referred to as phase shift keying (PSK) modulation, only the phase of the received signal is representative of the transmitted data. At the present time, two main types of receivers are used in such systems. In receivers of the first type, the signal received from the communication channel is first provided to the input of an ACC circuit, demodulated and sampled, and is then applied to the input of an analog-to-digital converter which provides a digital representation of the sampled signal. This digital representation is fed to a digital equalizer whose output signal is applied to the input of a data detection device, which extracts the data from the phase of the equalized signal. This type of receiver, because of the presence of an equalizer, is particularly useful in high-speed data communication systems which utilize noisy channels. In receivers of the second type, the signal received from the channel is frequency-translated and then clipped. The phase of the received signal is determined by comparing the zero crossings of the clipped signal with reference instants. The data are then detected by comparing the phase of the received signal with reference phase values. It should be noted that, in this type of receiver, the effect of the clipping operation is to eliminate all information relating to the amplitude of the received signal, so that the only remaining information relates to the phase of the signal. The second type of receiver is simpler than the first since it uses no AGC circuit or analog-to-digital converter, both of which are expensive devices. Nevertheless, its use has been limited to low speed data communication systems that utilize channels exhibiting low noise levels. This limitation is due to the fact that, until now, no automatic adaptive equalizer which solely used as input signal the phase of the received signal and could, therefore, be utilized in this type of receiver, was available.

Accordingly, it is the main object of this invention to provide a decision feedback equalizer which uses as input signal only the phase of the received signal and can be utilized, in particular, in a receiver of said second type in a data communication system relying upon the digital phase modulation technique.

Generally, this invention proposes a decision feedback equalizer wherein an approximate value $\bar{\alpha}_0$ of the phase of the signal transmitted at sampling time $t_0$ is obtained by subtracting a phase error $(\theta_0 - \bar{\alpha}_0)$ from the value $\theta_0$ of the phase of the signal received at $t_0$.

Value $\tilde{\alpha}_0$ is fed to a decision logic which provides an estimated value $\hat{\alpha}_0$ of the phase of the transmitted signal, which value is representative of the detected data. Value $\hat{\alpha}_0$ is fed to a decoder which provides its components in a Cartesian coordinates system. These components are fed to the inputs of a complex, cross-coupled equalizer which supplies the approximate values $\tilde{\Delta}u_0$ and $\tilde{\Delta}v_0$ of the components, in a Cartesian coordinates system, of the distorting signal representative of all distortions introduced by the communication channel. The phase error $(\theta_0 - \tilde{\alpha}_0)$ is obtained from the relation $$\sin(\theta_0 - \tilde{\alpha}_0) = \tilde{\Delta}u_0 \cos\theta_0 - \tilde{\Delta}u_0 \sin\theta_0.$$

The proposed decision feedback equalizer is made adaptive by adjusting the values of the coefficients of the complex equalizer to cause $\tilde{\alpha}_0$ to approximate as nearly as possible the value $\alpha_0$ of the signal transmitted at sampling time $t_0$.

The foregoing and other objects, features and advantages of the invention will be apparent from the following more particular description of a preferred embodiment of the invention, as illustrated in the accompanying drawings.

Before considering details of the invention, it is necessary to discuss the problems which the invention permits to solve. In what follows, a description will first be given of a communication system using a receiver of the above-mentioned first type which includes a conventional decision feedback equalizer, in order to aid in the understanding of the structure and operation of the proposed equalizer. A brief description of a receiver of the second type incorporating the proposed equalizer will then be given. Finally, the proposed equalizer itself will be described.

Figure 1:
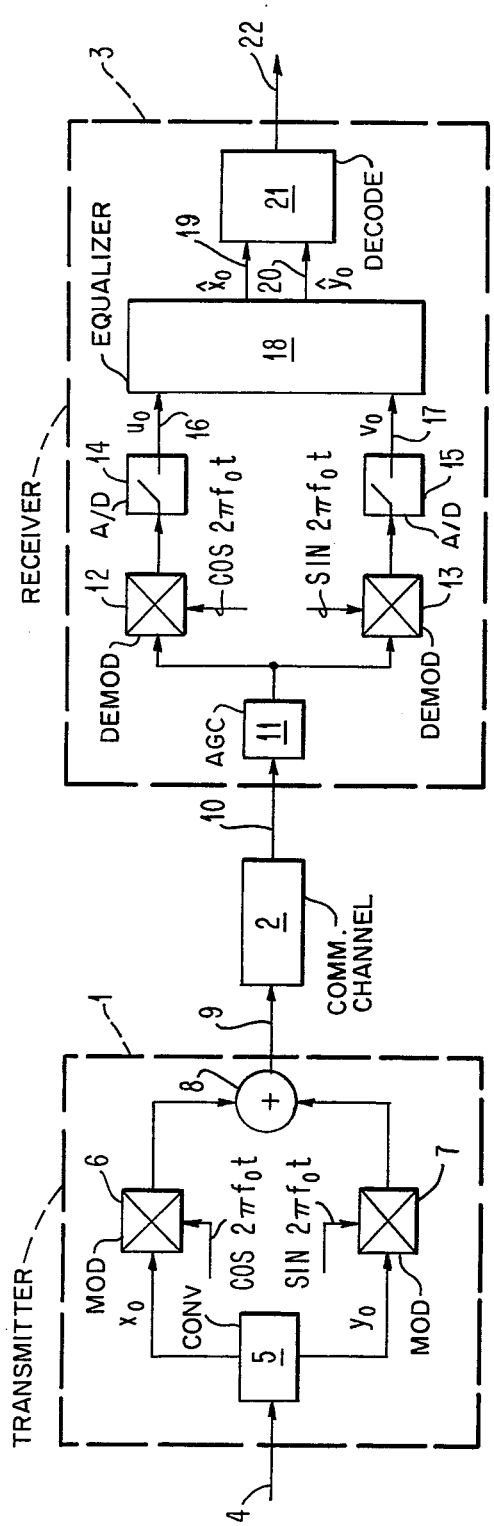
FIG. 1 is a simplified schematic diagram of a conventional digital data communication system utilizing the digital phase modulation technique.

Referring now to FIG. 1, there is shown a simplified diagram of a conventional digital data communication system using the digital phase modulation technique. For more details, reference should be made, for example, to "Data Transmission", by W. R. Bennett and J. R. Davey, chapter 10, McGraw-Hill, New York, 1965, in which the latter technique is described; to "Signal Theory," by L. E. Franks, section 4-4, pages 79-97, Prentice-Hall, Inc., Englewood Cliffs, N.J., 1969, in which the signal representation methods are discussed; and to the previously mentioned article by D. D. Falconner et al. The conventional system of FIG. 1 includes a transmitter 1, a communication channel 2 and a receiver 3. The sequence of input bits is fed to transmitter 1 via a line 4 and converted by a converter 5 to two sequences of symbols, $x_j$ and $v_j$, where $j$ can assume all integer values. Each of these symbols can assume a discrete number of values, generally equal to a power of two. At each sampling time, two symbols respectively belonging to said sequences, such as symbols $x_0$ and $y_0$, are fed to a couple of amplitude modulators 6 and 7, respectively, in which they serve to modulate the amplitude of two carriers in quadrature, $\cos 2\pi f_0 t$ and $\sin 2\pi f_0 t$, respectively. The outputs from modulators 6, 7 are summed in a summing device 8, the output signal of which is supplied via a line 9 to the input of communication channel 2. As is known, said signal will take the form of a sine wave of frequency $f_0$ the phase of which will assume discrete values as a function of the values of symbols $x_j$ and $y_j$ at the sampling times. For example, if symbols $x_j$ and $y_j$ can assume the values $\pm 1$, the phase of the resultant signal will have one of the four values $\pi/4$, $3\pi/4$, $5\pi/4$, $7\pi/4$ at each sampling time. For this reason, symbols $x_j$ and $y_j$ are generally referred to as the in-phase component and the quadrature component, respectively, of the transmitted signal. The output from channel 2 is fed to receiver 3 via a line 10. In the system of FIG. 1, receiver 3 is of the first type mentioned earlier. In receiver 3, the output signal from channel 2 is fed via line 10 to an AGC circuit 11, the output of which is supplied in parallel to two demodulators 12 and 13, in which the input signals are demodulated by the quadrature carrier $\cos 2\pi f_0 t$ and $\sin 2\pi f_0 t$, respectively. The outputs from demodulators 12, 13 are respectively fed to two sampling devices/analog-to-digital converters 14 and 15 which provide the in-phase and quadrature components $u_j$ and $v_j$ of the received signal, respectively. In FIG. 1, the components $u_0$ and $v_0$ corresponding to transmitted symbols $x_0$ and $y_0$ have been represented. The outputs from devices 14 and 15 are respectively applied via lines 16 and 17 to the input of a decision feedback equalizer 18 which provides the estimated values $\hat{x}_0$ and $\hat{y}_0$ of symbols $x_0$ and $y_0$ via lines 19 and 20, respectively, to a decoder 21 which supplies the detected bits on its output line 22.

In the absence of intersymbol interference and noise introduced by the channel, $u_0$ would be equal to $x_0$ and $v_0$ to $y_0$, and equalizer 18 would be unnecessary. However, as has been mentioned earlier, such is not the case in channels used for high-speed data communication, so that an equalizer must be provided in the receiver to compensate for the effects of the intersymbol interference. For the purposes of the present specification, it will be assumed that the distortions introduced by the channel are such that, in response to an input pulse, the channel provides a main pulse followed by lagging lobes. For simplification, it will further be assumed that no noise is introduced by the channel.

Figure 2:
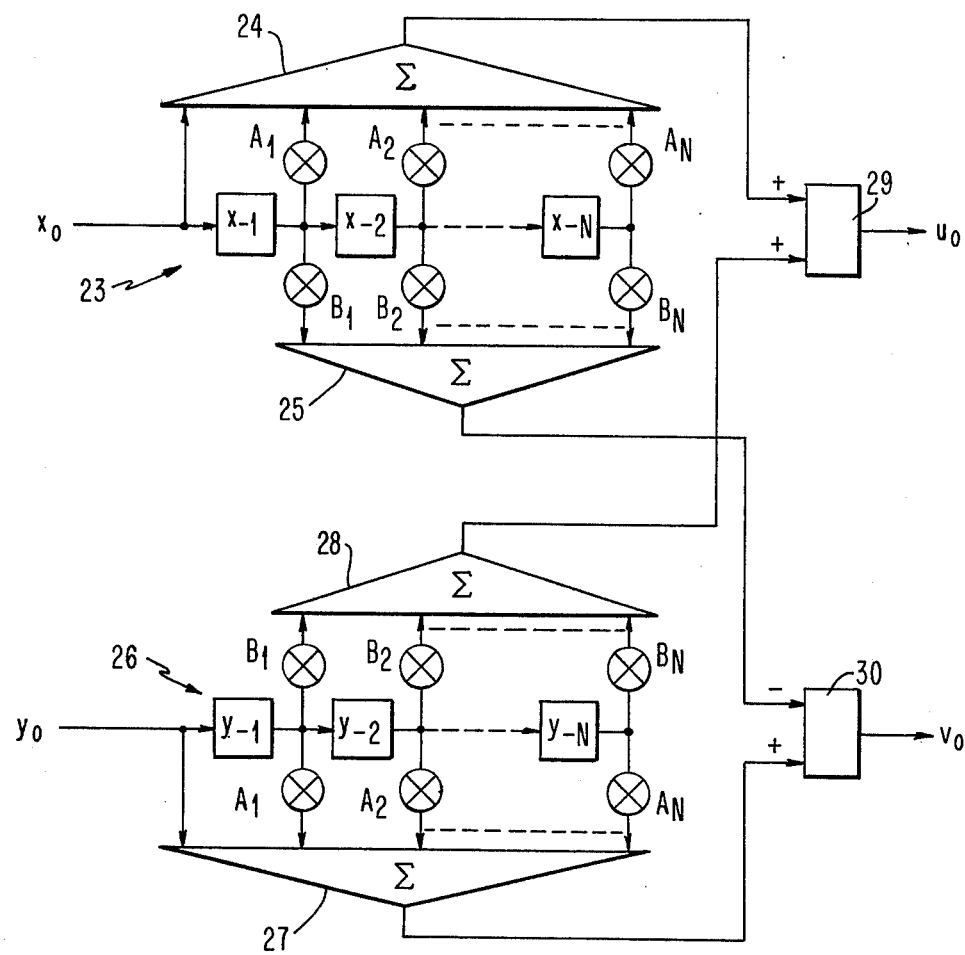
FIG. 2 illustrates a baseband model of a communication channel for a system using the digital phase modulation technique.

Referring now to FIG. 2, there is shown a simplified baseband model of the communication channel to clearly illustrate the intersymbol interference in a system using the digital phase modulation technique. Such a model is commonly used to analyze the intersymbol interference and is described, for instance, in the article by D. D. Falconner et al previously referred to. This model is called "baseband model" because it takes no account of modulation and demodulation. Such a model is, of course, purely imaginary, but nevertheless permits an analysis of the relationships between the values of $u_0$, $v_0$ and those of $x_0$, $y_0$ and of the N couples of preceding symbols $x_{-1}, x_{-2}, ..., x_{-N}$ and $y_{-1}, Y_{-2}, ...$, $y_{-N}$ where the distortions introduce N lagging lobes. The model shown includes a first delay line 23 comprised of N elementary cells each of which introduces a delay of T seconds, with 1/T being the sampling rate, and to the input of which symbol $x_0$ is applied. Delay line 23 comprises (N+1) taps with a T-sec. spacing. The first tap, located at the input of the delay line, is directly connected to one of the inputs of a summing device 24. The remaining taps are respectively connected to N other inputs of device 24 via N weighting circuits, the weighting coefficients of which are respectively equal to $A_1, A_2, ..., A_N$, and to the N inputs of another summing device 25 via N weighting circuits the weighting coefficients of which are respectively equal to $B_1, B_2, ..., B_N$. The model further includes a second delay line 26 with (N+1) taps which is identical to delay line 23 and receives symbol $y_0$. The first tap, located at the input of delay line 26, is directly connected to one of the inputs of a summing device 27. The remaining taps of delay line 26 are respectively connected to the N other inputs of device 27 through N weighting circuits the weighting coefficients of which are respectively equal to $A_1, A_2, ..., A_N$ and to the N inputs of another summing device 28 through N weighting circuits the weighting coefficients of which are respectively equal to $B_1, B_2, ..., B_N$. The outputs from summing devices 24 and 28 are respectively fed to the two (+) inputs of a summing device 29. The outputs from summing devices 25 and 27 are respectively applied to the (−) and (+) inputs of a subtractor 30. Components $u_0$ and $v_0$ are respectively available at the outputs of devices 29 and 30. Using the model of FIG. 2, components $u_0$ and $v_0$ can be expressed as $$u_0 = x_0 + A_1 x_{-1} + B_1 y_{-1} + ... + A_N x_{-N} + B_N y_{-N} \quad (1)$$

$$v_0 = y_0 + A_1 y_{-1} - B_1 x_{-1} + ... + A_N y_{-N} - B_N x_{-N} \quad (2)$$

The model of FIG. 2 and expressions (1) and (2) show that during transmission over the channel symbol $x_0$ is affected not only by the lagging lobes of the N preceding symbols $x_{-1}, x_{-2}, ..., x_{-N}$, with coefficients $A_1, A_2, ..., A_N$ being representative of the amplitude of the N lagging lobes, but also by the lagging lobes of the N preceding symbols $y_{-1}, y_{-2}, ..., y_{-N}$, with coefficients $B_1, B_2, ..., B_N$ being representative of the amplitude of the N lagging lobes of symbols $y_{-1}, y_{-2}, ..., y_{-N}$. Similarly, symbol $y_0$ is affected by the lagging lobes of symbols $y_{-1}, y_{-2}, ..., y_{-N}$ and $x_{-1}, x_{-2}, ..., x_{-N}$.

Figure 3:
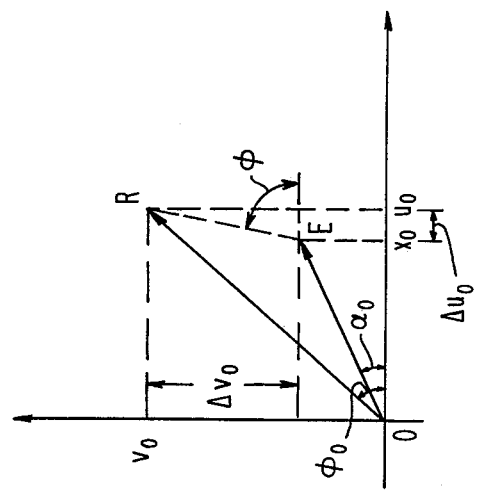
FIG. 3 is a vector diagram intended to aid in the understanding of the invention.

The analysis performed by means of the model of FIG. 2 can be visualized using the vector diagram of FIG. 3. The signal received at sampling time $t_0$ can be represented by a vector $\overrightarrow{OR}$ the components $u_0$ and $v_0$ of which can be expressed as $$u_0 = \lambda \cos \theta_0 \quad (3)$$

$$v_0 = \lambda \sin \theta_0 \quad (4)$$

where $\lambda$ and $\theta_0$ are the amplitude and the phase of the received signal, respectively. Similarly, the signal transmitted at sampling time $t_0$ can be represented by a vector OE the components of which are $x_0$ and $y_0$. If we assume, for simplicity, that the amplitude of the transmitted signal is equal to 1 and if we call $\alpha_0$ the value of the phase of that signal, we may put $$x_0 = \cos \alpha_0 \quad (5)$$

$$y_0 = \sin \alpha_0 \quad (6)$$

If so, vector $\overrightarrow{OR}$, representing the received signal, may be regarded as the sum of vector $\overrightarrow{OE}$, representing the transmitted signal, and vector $\overrightarrow{ER}$, representing the distorting signal representative of all distortions affecting the transmitted signal. Thus, if we call $\Delta u_0$ and $\Delta v_0$ the components of vector $\overrightarrow{ER}$, we obtain $$u_0 = x_0 + \Delta u_0 \quad (7)$$

$$v_0 = y_0 + \Delta v_0 \quad (8)$$

Comparing expressions (7), (8) and (1), (2), we arrive at $$\Delta u_0 = A_1 x_{-1} + B_1 y_{-1} + ... + A_N x_{-N} + B_N y_{-N} \quad (9)$$

$$\Delta v_0 = A_1 y_{-1} - B_1 x_{-1} + ... + A_N y_{-N} - B_N x_{-N} \quad (10)$$

It is thus seen that vector $\overrightarrow{OE}$, representative of the transmitted signal, can be determined by subtracting from vector $\overrightarrow{OR}$, representative of the received signal, the vector $\overrightarrow{ER}$ reconstructed from the components of the signals transmitted at the N preceding sampling times and from the values of coefficients $A_1, ..., A_N$ and $B_1, ..., B_N$, using expressions (9) and (10).

The manner in which a prior art decision feedback equalizer can be used to determine the components $x_0$ and $y_0$ of vector OE, representative of the transmitted signal, from the components $u_0$ and $v_0$ of the received signal, in accordance with the principle mentioned in the preceding paragraph, will now be described with reference to FIG. 4, which is a schematic diagram of the conventional decision feedback equalizer shown as block 18 in FIG. 1. Component $u_0$, provided by device 14 (FIG. 1) via line 16, is fed to the (+) input of a subtractor 31 the output of which is applied to the input of a decision logic 32. The output of decision logic 32 is applied to an output line 19 as well as to the input of a first delay line 33 comprising N elementary cells each of which introduces a delay equal to T seconds. The output of each of these cells is connected to a tap. The N taps are respectively connected to the N inputs of a summing device 34 through N weighting circuits the weighting coefficients of which are respectively equal to $C_1, C_2, ..., C_N$ and to the N inputs of another summing device 35 through N weighting circuits the weighting coefficients of which are respectively equal to $D_1, D_2, ..., D_N$. The component $v_0$ supplied by device 15 (FIG. 1) via line 17 is fed to the (+) input of subtractor 36 the output of which is fed to a decision logic 37. The output of decision logic 37 is applied to an output line 20 as well as to the input of a second tapped delay line 38 identical to delay line 33. The N taps of delay line 38 are respectively connected to the N inputs of a summing device 39 through N weighting circuits the weighting coefficients of which are respectively equal to $C_1, C_2, ..., C_N$, and to the N inputs of another summing device 40 through N weighting circuits the weighting coefficients of which are respectively equal to $D_1, D_2, ..., D_N$. The outputs of summing devices 34 and 40 are respectively connected to the (+) inputs of a summing device 41 the output of which is connected to the (−) input of subtractor 31. The outputs of summing devices 35 and 39 are respectively connected to the (−) and (+) inputs of a subtractor 42 the output of which is connected to the (−) input of subtractor 36. The structure 43, which includes delay lines 33, 38, the circuits associated therewith and devices 41, 42 constitutes a complex equalizer referred to as a cross-coupled equalizer a description of which is provided, for instance, in U.S. Pat. No. 3,947,768 issued Mar. 30, 1976, to A. E. Desblache et al and assigned to the Assignee of this patent application.

The operation of the equalizer shown in FIG. 4 will now be described. For convenience, decision logics 32 and 37 will be used as starting points. Decision logics 32 and 37 provide estimated values $\hat{x}_0$ and $\hat{y}_0$ of the components $x_0$ and $y_0$ of the transmitted signal, respectively. When these values become available at the respective outputs of circuits 32 and 37, the estimated values $\hat{x}_{-1}, \hat{x}_{-2}, ..., \hat{x}_{-N}$ and $\hat{y}_{-1}, \hat{y}_{-2}, ..., \hat{y}_{-N}$ of the components of the signals transmitted at the N preceding sampling times are respectively available at the N taps of delay lines 33 and 38. If we call $\tilde{\Delta}u_0$ and $\tilde{\Delta}v_0$ the signals provided by adder 41 and subtractor 42, respectively, we can write $$\tilde{\Delta}u_0 = C_1\hat{x}_{-1} + D_1\hat{y}_{-1} + ... + C_N\hat{x}_{-N} + D_N\hat{y}_{-N} \quad (11)$$

$$\tilde{\Delta}v_0 = C_1\hat{y}_{-1} - D_1\hat{x}_{-1} + ... + C_N\hat{y}_{-N} - D_N\hat{x}_{-N} \quad (12)$$

Signals $\tilde{\Delta}u_0$ and $\tilde{\Delta}v_0$ are respectively fed to the (−) inputs of subtractors 31 and 36. If we call $\tilde{x}_0$ and $\tilde{y}_0$ the signals obtained at the outputs of these subtractors, we can write $$\tilde{x}_0 = u_0 - \tilde{\Delta}u_0 \quad (13)$$

$$\tilde{y}_0 = v_0 - \tilde{\Delta}v_0 \quad (14)$$

Comparing expressions (9), (10) and (11), (12), we find that if the signals received at the N preceding sampling times have been correctly detected, that is, if $$\hat{x}_{-i} = x_{-i} \text{ and } \hat{y}_{-i} = y_{-i} \text{ with } i=1, 2, ..., N$$

and if the weighting coefficients are adjusted such that $$C_i = A_i \text{ and } D_i = B_i \text{ with } i=1, 2, ..., N$$

we have $$\Delta\tilde{u}_0 = \Delta u_0 \quad (15)$$

$$\Delta\tilde{v}_0 = \Delta v_0 \quad (16)$$

In that case, expressions (13) and (14) become $$\tilde{x}_0 = u_0 - \Delta u_0 \quad (17)$$

$$\tilde{y}_0 = v_0 - \Delta v_0 \quad (18)$$

and, from (7) and (8), we have $$\tilde{x}_0 = x_0 \text{ and } \tilde{y}_0 = y_0$$

Thus, the components $x_0$ and $y_0$ of the transmitted signal are directly obtained at the outputs of subtractors 31 and 36.

In practice, few detection errors are experienced but the weighting coefficients $C_i$ and $D_i$ are not perfectly adjusted, so that $\tilde{\Delta}u_0$ and $\tilde{\Delta}v_0$ are merely approximate values of $\Delta u_0$ and $\Delta v_0$, respectively. As a result, signals $\tilde{x}_0$ and $\tilde{y}_0$ as obtained at the outputs of subtractors 31 and 36 only represent approximate values of $x_0$ and $y_0$, respectively. Approximate values $\tilde{x}_0$ and $\tilde{y}_0$ are respectively fed to decision logics 32 and 37 which supply estimated values $\hat{x}_0$ and $\hat{y}_0$ of the components $x_0$ and $y_0$ of the transmitted signal, respectively.

Figure 4:
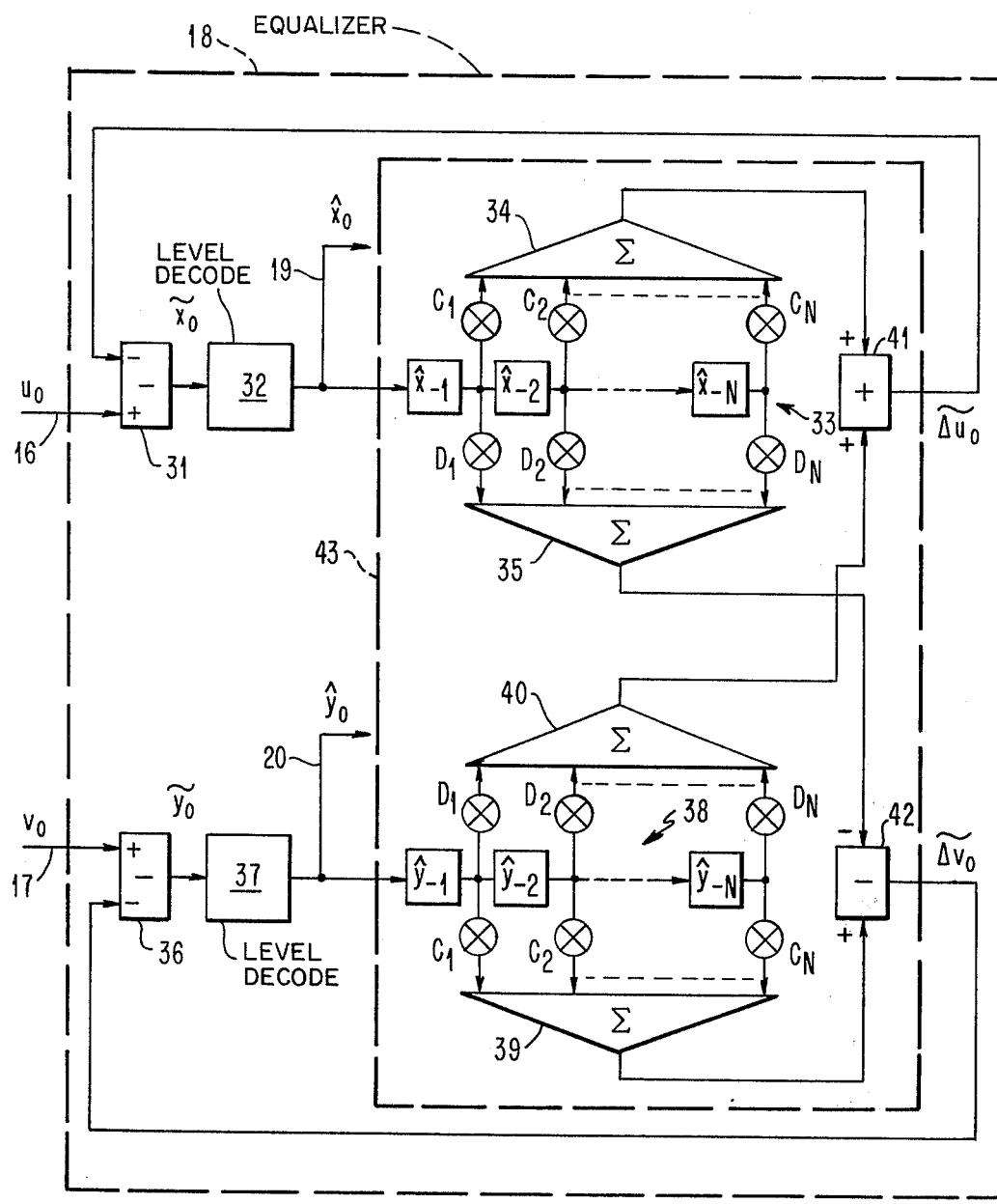
FIG. 4 represents a conventional decision feedback equalizer.

It will be observed that the conventional decision feedback equalizer shown in FIG. 4 uses as input signals the components $u_0$ and $v_0$ of the received signal, that is, information relating to the phase and to the amplitude of that signal. As has been mentioned, the main object of the invention is to provide a decision feedback equalizer which uses as its input signal only the phase value of the received signal.

Figure 5:
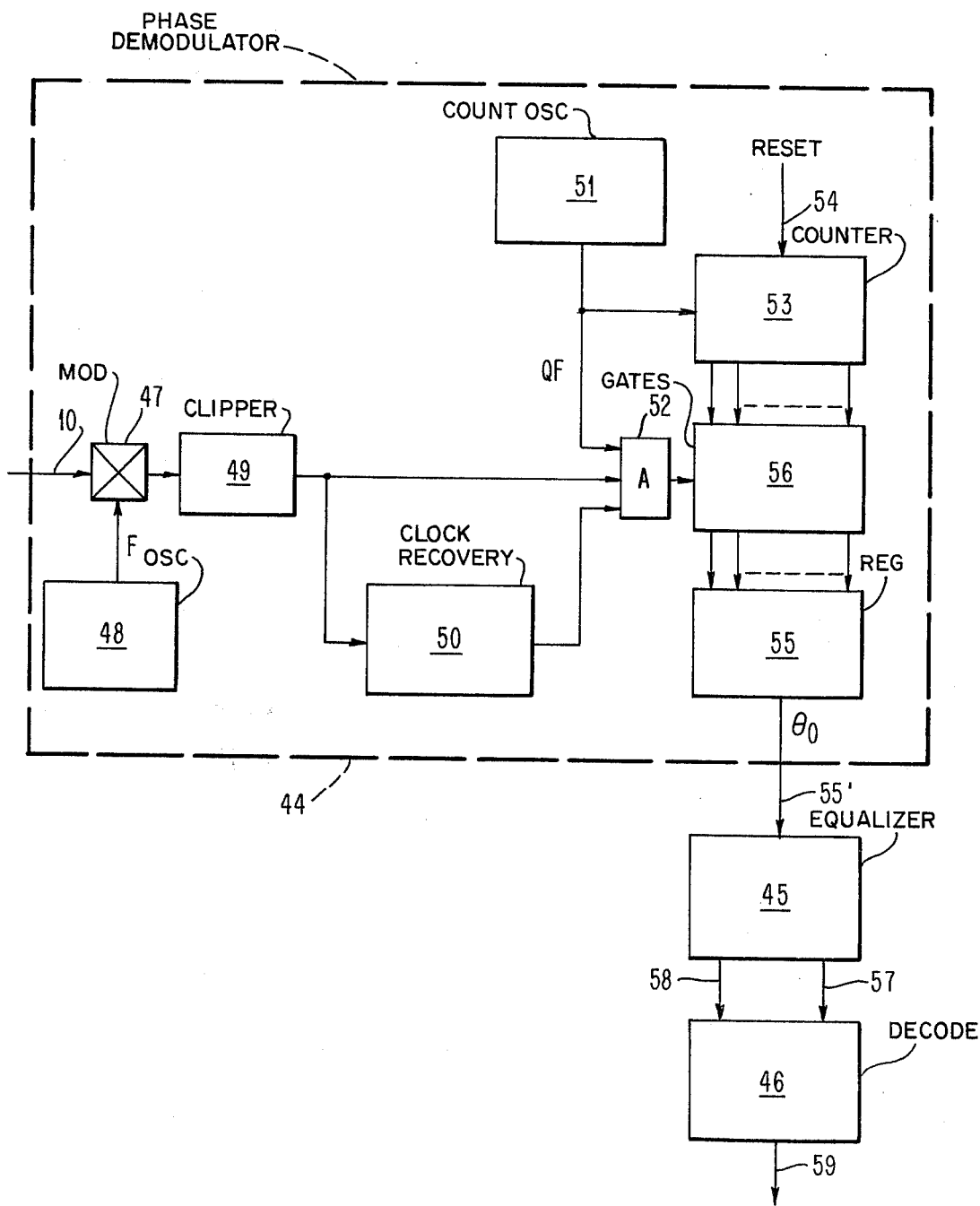
FIG. 5 is a schematic drawing of a receiver incorporating the equalizer of the invention.

A receiver of the second type mentioned earlier in which the proposed equalizer can be incorporated will now be described with reference to FIG. 5. In a digital data communication system using such a receiver, the transmitter and the communication channel are identical to those used with a receiver of the first type, as diagrammatically illustrated in FIG. 1. The receiver of the second type that is shown in FIG. 5 mainly consists of a phase demodulator 44, the equalizer of the present invention illustrated as block 45, and a decoder 46 similar to decoder 21 of FIG. 1. Phase demodulator 44 is of a conventional type and may be similar, for example, to the phase demodulator described in detail in French Pat. No. 1,571,835, a simplified form of which is shown in FIG. 5. The signal received from the channel 2 (FIG. 1) via line 10 is fed to a modulator 47 which translates the frequency of the signal into a higher frequency by means of an auxiliary sine wave of frequency F supplied by a local oscillator 48. The output from modulator 47 is supplied to the input of a waveform shaping device 49 which causes the frequency-translated signal to be clipped and thus generates a square wave in which the transitions are representative of the zero crossings of the received signal. The output from device 49 is provided to the input of a clock recovery device 50, which generates strobing pulses at the sampling frequency, the width of each pulse being equal to about 1/F sec. The outputs from devices 49 and 50, and the output from an oscillator 51 which provides high frequency counting pulses, the frequency generally being equal to QF, where Q is the number of distinct values the phase of the carrier can assume at the sampling times, are respectively fed to the three inputs of an AND gate 52. The output from oscillator 51 is also applied to the input of a binary counter 53 which is reset to zero by a control signal applied on line 54. The count value of binary counter 53 is transferred to a binary register 55 through a set 56 of AND gates under control of the output signal of AND gate 52. The contents of register 55, which are representative of the phase $\theta_0$ of the received signal, are available on output line 55′. In operation, it is assumed that the count value of binary counter 53 is reset to zero by a control signal sent over line 54, when the first positive-going transition of the frequency-translated signal provided by shaping device 49 takes place. AND gate 52 supplies a read pulse when a counting pulse generated by oscillator 51 coincides with the first negative-going transition of the frequency-translated signal provided by device 49, while the strobe pulse generated by the clock recovery device 50 is present. The read pulse opens the AND gates in set 56, thereby gating the count value of counter 53 to register 55. At this time, counter 53 has counted the counting pulses provided by oscillator 51 during the time interval that elapsed between the first positive-going transition and the first negative-going transition of the frequency-translated signal supplied by device 49. The count value which is then gated to register 55 is representative of the phase $\theta_0$ of the received signal. For further information on the structure and operation of phase demodulator 44, which forms no part of this invention, reference should be made to the previously mentioned French Pat. No. 1,571,835.

The value $\theta_0$ of the phase of the received signal is fed via line 55' to the input of the equalizer of the present invention, which provides the estimated values $\hat{x}_0$ and $\hat{Y}_0$ of the components of that signal on lines 57 and 58, respectively. These estimated values are then fed to decoder 46 which provides on line 59 the sequence of detected bits. Decoder 46 is a conventional logic circuit which supplies bit sequences as a function of the values $\hat{x}_0$ and $\hat{y}_0$. The table below gives some examples of bit sequences provided by decoder 46 as a function of estimated values $\hat{x}_0$ and $\hat{y}_0$ for a data communication system using a four-phase type of modulation. No limitation thereto is however intended. For example, it would be entirely feasible to use correspondence tables such that the bit sequences would be a function of $\hat{x}_{-1}$ and $\hat{y}_{-1}$ in addition to $\hat{x}_0$ and $\hat{y}_0$.

| $\hat{x}_0$ | $\hat{y}_0$ | Output of Circuit 46 | |
|---|---|---|---|
| +1 | +1 | 1 | 1 |
| −1 | +1 | 0 | 1 |
| −1 | −1 | 0 | 0 |
| +1 | −1 | 1 | 0 |

Figure 6:
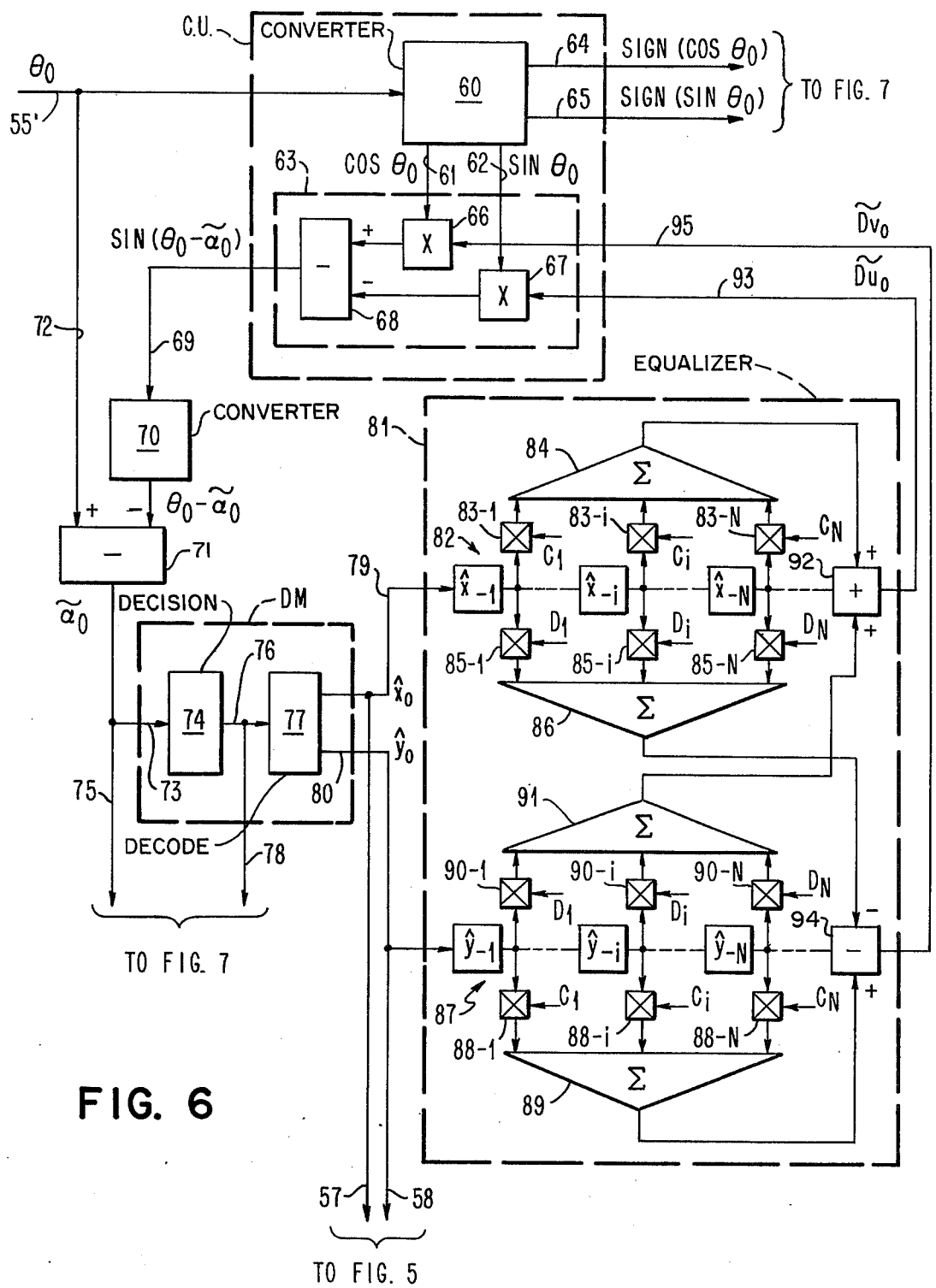
FIG. 6 illustrates the decision feedback equalizer of the invention.

The equalizer of the invention, which is shown in FIG. 6, will now be described in detail, referring first to the vector diagram of FIG. 3 to aid in the understanding of the invention.

As previously mentioned, vectors $\overrightarrow{OR}$, $\overrightarrow{OE}$ and $\overrightarrow{ER}$ represent the received signal, the transmitted signal, and the distorting signal representative of all distortions, respectively, the components of these vectors being $u_0$ and $v_0$, $x_0$ and $y_0$, and $\Delta u_0$ and $\Delta v_0$, respectively. The relationships betweeen these various components are given by expressions (7) and (8) which are repeated here for convenience:

$$u_0 = x_0 + \Delta u_0 \quad (7)$$
$$v_0 = y_0 + \Delta v_0 \quad (8)$$

Replacing $u_0$, $v_0$, $x_0$ and $y_0$ in expressions (7) and (8) by their values in expressions (3), (4), (5) and (6), expressions (7) and (8) respectively becomes $$\lambda \cos \theta_0 = \cos \alpha_0 + \Delta u_0 \quad (19)$$
$$\lambda \sin \theta_0 = \sin \alpha_0 + \Delta v_0 \quad (20)$$

Combining expressions (19) and (20), we obtain $$\sin \theta_0 \cos \alpha_0 - \cos \theta_0 \sin \alpha_0 = \Delta v_0 \cos \theta_0 - \Delta u_0 \sin \theta_0 \quad (21)$$

which can be written as $$\sin (\theta_0 - \alpha_0) = \Delta v_0 \cos \theta_0 - \Delta u_0 \sin \theta_0 \quad (22)$$

As is apparent from expression (22), the phase error $(\theta_0 - \alpha_0)$ which is to be subtracted from the value $\theta_0$ of the phase of the signal received at sampling time $t_0$ in order to obtain the value $\alpha_0$ of the phase of the signal transmitted at sampling time $t_0$, can be determined from the values of $\theta_0$, $\Delta u_0$ and $\Delta v_0$ only. The manner in which the equalizer of FIG. 6 recovers value $\theta_0$ from the value $\theta_0$ of the received signal, using expression (22), will now be described.

The value $\theta_0$, provided by phase demodulator 44 (FIG. 5) of the phase of the signal received at sampling time $t_0$ is fed via line 55' to a computation unit CU. In the embodiment shown by way of example in FIG. 6, unit CU comprises conversion means 60 for converting $\theta_0$ into $\sin \theta_0$ and $\cos \theta_0$ on output lines 62 and 61 respectively, and computation means 63. In a preferred embodiment of the invention, conversion means 60 consist of a binary read-only memory containing a conversion table for converting $\theta_0$ into $\sin \theta_0$ and $\cos \theta_0$. The use of such memories for performing conversions of this type is quite common since programmable read-only memories in which data can be directly stored by the user are not available. The binary coded values of $\cos \theta_0$ and $\sin \theta_0$ supplied by conversion means 60 are respectively fed via the output lines 61 and 62 to computation means 63, while "sign of $\cos \theta_0$" and "sign of $\sin \theta_0$" indications are respectively fed via lines 64 and 65 to the weighting coefficient adjustment means illustrated in FIG. 7. Conventionally, such indications consist of the sign bit of the binary coded values of $\cos \theta_0$ and $\sin \theta_0$. Computation means 63 include a first binary multiplier 66 one of whose inputs is connected to line 61, a second binary multiplier 67 one of whose inputs is connected to line 62, and a binary subtractor 68 the (+) and (−) inputs of which are respectively connected to the outputs of multipliers 66 and 67. In a preferred embodiment of the invention, devices 66 and 67 are conventional serial-parallel multipliers to the inputs of which the binary coded values of $\cos \theta_0$ and $\sin \theta_0$ supplied by read-only memory 60 are applied in parallel. Device 68 may be a conventional serial subtractor. The output from unit CU, which consists of the output from subtractor 68, is provided via line 69 to the input of conversion means 70 which converts the input value to the corresponding arcsine. Means 70 may consist of a read-only memory comprising a conversion table. The output from conversion means 70 is fed to the (−) input of a binary subtractor 71, the (+) input of which receives the value $\theta_0$ via lines 55' and 72. The output of subtractor 71 is connected via line 73 to the input of decision means DM and via line 75 to the weighting coefficient adjustment means shown in FIG. 7. In the embodiment illustrated in FIG. 6, decision means DM includes a decision logic 74 the input of which is connected to line 73 and a decoder 77 (to be described later) the input of which is connected via line 76 to the output of decision logic 74. The output of logic 74 is also connected via line 78 to the adjustment means of FIG. 7. Decision logic 74 will later be discussed in connection with FIG. 8. The outputs of decision means DM, which are in fact the $\hat{x}_0$ and $\hat{y}_0$ outputs of decoder 77, are connected via lines 79 and 80 to the inputs of a complex, cross-coupled equalizer 81 similar to equalizer 43 of FIG. 4. Within equalizer 81, line 79 is connected to the input of a tapped delay line 82 comprising N elementary cells, each of which introduces a delay of T sec., and N taps respectively located at the outputs of the N cells. In a preferred embodiment of the invention, delay line 82 is comprised of a conventional digital shift register. The N taps are respectively connected to a first input of N binary multipliers 83-$l$,..., 83-$i$, ..., 83-N the second input of which receives weighting coefficients $C_l$, ..., $C_i$, ..., $C_N$, respectively. The outputs of multipliers 83-$l$, ..., 83-N are connected to the N inputs of a digital summing device 84 consisting, for example, of one of the digital summing devices commonly used in digital filters. In addition, the N taps of delay line 82 are respectively connected to a first input of N binary multipliers 85-l, ..., 85-i, ..., 85-N the second input of which receives weighting coefficients $D_l$, ..., $D_i$, ..., $D_N$ respectively. The outputs of multipliers 85-l, ..., 85-N are connected to the N inputs of a digital summing device 86 identical to device 84. Line 80 is connected to the input of a delay line 87 which is identical to delay line 82 and comprises N taps. The latter are respectively connected to a first input of N binary multipliers 88-l, ..., 88-i, ..., 88-N the second input of which receives the values of weighting coefficients $C_l$, ..., $C_i$, ..., $C_N$, respectively. The outputs of multipliers 88-l, ..., 88-N are connected to the N inputs of a digital summing device 89 identical to summing devices 84 and 86. Additionally, the N taps of delay line 87 are respectively connected to a first input of N binary multipliers 90-l, ..., 90-i, ..., 90-N the second input of which receives the values of weighting coefficients $D_l$, ..., $D_i$, ..., $D_N$, respectively. The outputs of multipliers 90-l, ..., 90-N are connected to the N inputs of a digital summing device 91 identical to summing devices 84, 86 and 89. The values of weighting coefficients $C_l$, ..., $C_i$, ..., $C_N$ and $D_l$, ..., $D_i$, ..., $D_N$ are provided by means (not shown in FIG. 6) to be described later in connection with FIG. 7. The outputs of summing devices 84 and 91 are respectively connected to the two (+) inputs of a binary adder 92 the output of which is connected via line 93 to the second input of multiplier 67. The outputs of summing devices 86 and 89 are respectively connected to the (−) and (+) inputs of a binary subtractor 94 the output of which is connected via line 95 to the second input of multiplier 66.

Figure 8:
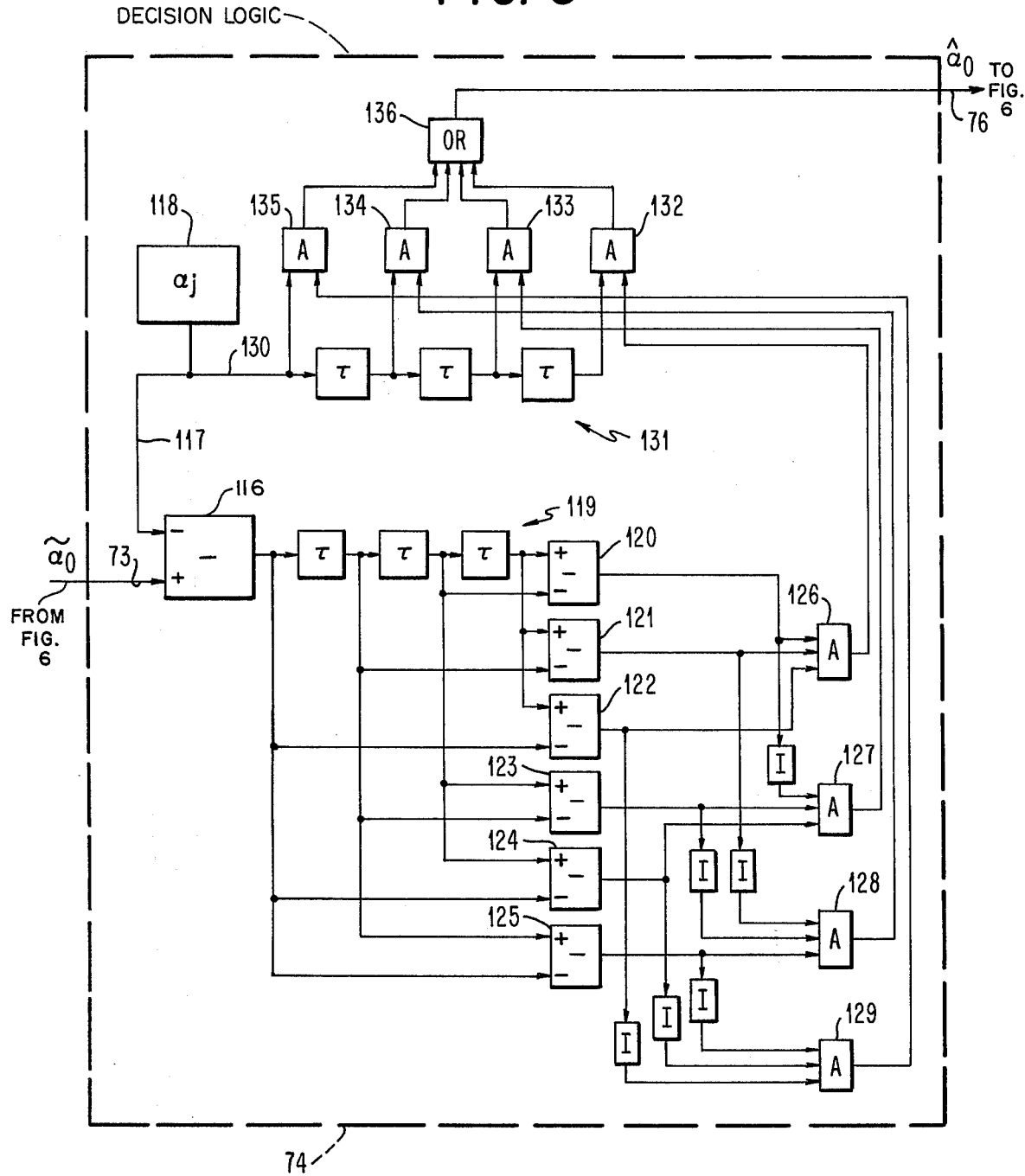
FIG. 8 illustrates an embodiment of the decision logic used in the equalizer of the invention.

The operation of the equalizer of the present invention will now be described, using decision logic 74 as a starting point. Decision logic 74, which will be described in detail in connection with FIG. 8, provides on line 76 an estimated value $\hat{\alpha}_0$ of the phase of the signal transmitted at sampling time $t_0$. This estimated value is fed to decoder 77, which supplies the components $\hat{x}_0$ and $\hat{y}_0$ of $\hat{\alpha}_0$ in a Cartesian coordinates system via lines 79 and 80, respectively. Decoder 77 is a conventional logic circuit and the table below shows by way of example the relationships between the values of $\hat{\alpha}_0$ and those of $\hat{x}_0$ and $\hat{y}_0$ for a communication system wherein the phase of the transmitted signal can assume one of four distinct values at each sampling time

| $\hat{\alpha}_0$ | $\hat{x}_0$ | $\hat{y}_0$ |
|---|---|---|
| $\pi/4$ | +1 | +1 |
| $3\pi/4$ | −1 | +1 |
| $5\pi/4$ | −1 | −1 |
| $7\pi/4$ | +1 | −1 |

The values of components $\hat{x}_0$ and $\hat{y}_0$ are fed via lines 79 and 80, respectively, to the complex, cross-coupled equalizer 81. Since the latter is identical to the cross-coupled equalizer 43 described in connection with FIG. 4 and receives the same input signals, the approximate value $\tilde{\Delta u}_0$ and $\tilde{\Delta v}_0$ of the components of vector ER of FIG. 4 are obtained at the output of equalizer 81. The values $\tilde{\Delta u}_0$ and $\tilde{\Delta v}_0$ as provided by equalizer 81 are fed via lines 93 and 95, respectively, to the inputs of computation means 63, which supply the quantity $$\tilde{\Delta v}_0 \cos \theta_0 - \tilde{\Delta u}_0 \sin \theta_0 \tag{23}$$

Since, from expression (22), the quantity $$\Delta v_0 \cos \theta_0 - \Delta u_0 \sin \theta_0 \tag{24}$$

is equal to $\sin(\theta_0 - \alpha_0)$, we can replace $\Delta v_0$ and $\Delta u_0$ in (24) by approximate values $\tilde{\Delta v}_0$ and $\tilde{\Delta u}_0$, in which case quantity (23) is equal to $\sin(\theta_0 - \tilde{\alpha}_0)$, where $\tilde{\alpha}_0$ is an approximate value of $\alpha_0$. Therefore $$\sin(\theta_0 - \tilde{\alpha}_0) = \tilde{\Delta v}_0 \cos \theta_0 - \tilde{\Delta u}_0 \sin \theta_0 \tag{25}$$

The quantity of $\sin(\theta_0 - \tilde{\alpha}_0)$ thus developed by computation means 63 is fed via line 67 to the second computation means 70 which provides the quantity of $(\theta_0 - \tilde{\alpha}_0)$. The latter is subtracted from value $\theta_0$ by subtractor 71, which then provides value $\tilde{\alpha}_0$. The approximate value $\tilde{\alpha}_0$ of the value $\alpha_0$ of the phase of the signal transmitted at sampling time $t_0$ is fed via line 73 to decision logic 74. The function of the latter is to provide an estimate $\hat{\alpha}_0$ of the phase of the signal transmitted at sampling time $t_0$, from the approximate value $\tilde{\alpha}_0$. In the general case, this estimate is obtained by comparing $\tilde{\alpha}_0$ with all values $\alpha_j$ which the phase of the signal transmitted at each sampling time may assume, and by selecting the value nearest $\tilde{\alpha}_0$. The selected value $\hat{\alpha}_0$, is then regarded as the estimated value of the phase of the signal transmitted at the sampling time considered. Estimated value $\hat{\alpha}_0$ is supplied via line 76 to decoder 77 which provides components $\hat{x}_0$ and $\hat{y}_0$ to the inputs of cross-coupled equalizer 81. Components $\hat{x}_0$ and $\hat{y}_0$ are also applied via lines 57 and 58, respectively, to the inputs of the decoder 46 of FIG. 3, which extracts therefrom the sequence of detected bits. It should be noted that this sequence could also be directly extracted from the value $\hat{\alpha}_0$. In the illustrated embodiment, it is more convenient to extract the sequence of detected bits from the values of $\hat{x}_0$ and $\hat{y}_0$ since these values are available at the outputs of decoder 77. It should also be noted that, in some cases, the decision means DM need not be comprised of a decision logic providing estimated value $\hat{\alpha}_0$ and of a decoder providing components $\hat{x}_0$ and $\hat{y}_0$. For example, if the phase of the signal transmitted at each sampling time can assume any one of the four values $\pi/4$, $3\pi/4$, $5\pi/4$, $7\pi/4$, that is, if $\hat{x}_0, \hat{y}_0 = \pm 1$, then the values of $\hat{x}_0$ and $\hat{y}_0$ can be directly obtained by determining in which quadrant the approximate value $\tilde{\alpha}_0$ is located. Thus, if $0 < \tilde{\alpha}_0 < \pi/2$, then $\hat{x}_0 = \hat{y}_0 = 1$. This result can be achieved by means of simple logic devices.

Also, computation unit CU could take the form, for example, of the so-called CORDIC device described in the article entitled "The CORDIC Trigonometric Computing Technique," by Jack E. Volder, in IRE Transactions on Electronic Computers, September, 1959, pages 330–334. The CORDIC device is a specialized computation unit which, in response to input values X, Y, and $\lambda$, computes the quantity $$Q = k(X \cos \lambda - Y \sin \lambda)$$

where $k$ is a constant.

In the present invention, if quantities $\tilde{\Delta u}_0$, $\tilde{\Delta v}_0$ and $\theta_0$ were fed to a CORDIC unit, the quantity obtained at the output thereof would be $$\tilde{\Delta v}_0 \cos \theta_0 - \tilde{\Delta u}_0 \sin \theta_0$$

which is equal to $\sin(\theta_0 - \tilde{\alpha}_0)$ in accordance with expression (22).

Having described the general structure of the equalizer of the present invention, as illustrated in FIG. 6, we shall now describe the manner in which the values of weighting coefficients $C_1, C_2, ..., C_N$ and $D_1, D_2, ..., D_N$ can be adjusted to continually optimize the operation of the equalizer, that is to say, to cause the value of $\tilde{\alpha}_0$ to be as close as possible to the value $\tilde{\alpha}_0$ of the phase of the transmitted signal.

Assume that the values of the weighting coefficients are improperly adjusted. For the purposes of the calculation of the corresponding error associated with the value of coefficient $D_i$, with $i=1, 2, ..., N$, it is convenient to correlate the quantity $$(dx_0 \sin \theta_0 - dy_0 \cos \theta_0) \quad (26)$$

with the quantity $$(\hat{x}_{-i} \cos \theta_0 + \hat{y}_{-i} \sin \theta_0) \quad (27)$$

where $dx_0$ and $dy_0$ are the respective differentials of components $x_0$ and $y_0$ of the transmitted signal and represent the errors respectively associated with $x_0$ and $y_0$ as a result of the improper adjustment of the weighting coefficient values.

The correlation is conventionally written as $$\overline{(dx_0 \sin \theta_0 - dy_0 \cos \theta_0)(\hat{x}_{-i} \cos \theta_0 + \hat{y}_{-i} \sin \theta_0)} \quad (28)$$

where the horizontal bar denotes the time average of the product of the two quantities in parentheses.

We have seen in connection with the vector diagram of FIG. 3 that expressions (7) and (8) which are repeated below, were derived:

$$u_0 = x_0 + \Delta u_0 \quad (7)$$
$$v_0 = y_0 + \Delta v_0 \quad (8)$$

or $$x_0 = u_0 - \Delta u_0 \quad (7')$$
$$y_0 = v_0 - \Delta v_0 \quad (8')$$

Taking the differentials of the terms in expressions (7′) and (8′), we have $$dx_0 = du_0 - d(\Delta u_0) \quad (29)$$
$$dy_0 = dv_0 - d(\Delta v_0) \quad (30)$$

Since the components $u_0$ and $v_0$ of the received signal are independent of the value of the weighting coefficients, we have $du_0=0$ and $dv_0=0$, and expressions (29) and (30) reduce to $$dx_0 = -d(\Delta u_0) \quad (31)$$
$$dy_0 = -d(\Delta v_0) \quad (32)$$

Since the differentials $d(\Delta v_0)$ are representative of the errors affecting the components of vector ER as reconstructed by cross-coupled equalizer 77, we can write $$d(\Delta u_0) = \hat{x}_{-1} dV_1 + \hat{y}_{-1} dD_1 + ... + \hat{x}_{-N} dC_N + \hat{y}_{-N} dD_N \quad (33)$$

and $$d(\Delta v_0) = \hat{y}_{-1} dC_1 - \hat{x}_{-1} dD_1 + ... + \hat{y}_{-N} dC_N - \hat{x}_{-N} dD_N \quad (34)$$

$$dx_0 = \hat{x}_{-1} dC_1 - \hat{y}_{-1} dD_1 - ... - \hat{x}_{-N} dC_N - \hat{y}_{-N} dD_N \quad (33')$$
$$dy_0 = -\hat{y}_{-1} dC_1 + \hat{x}_{-1} dD_1 - ... - \hat{y}_{-N} dC_N + \hat{x}_{-N} dD_N \quad (34')$$

or $$dx_0 = -\sum_{i=1}^{N} (\hat{x}_{-i} dC_i + \hat{y}_{-i} dD_i) \quad (35)$$

$$dy_0 = \sum_{i=1}^{N} (\hat{x}_{-i} dD_i - \hat{y}_{-i} dC_i) \quad (36)$$

If we replace $dx_0$ and $dy_0$ in (28) with the values in expressions (35) and (36), correlation (28) becomes $$\overline{(dx_0 \sin \theta_0 - dy_0 \cos \theta_0)(\hat{x}_{-i} \cos \theta_0 + \hat{y}_{-i} \sin \theta_0)} =$$
$$\overline{\left(-\left[\sum_{i=1}^{N}(\hat{x}_{-i} dC_i + \hat{y}_{-i} dD_i)\right]\sin \theta_0 - \left[\sum_{i=1}^{N}(\hat{x}_{-i} dD_i - \hat{y}_{-i} dC_i)\right]\cos \theta_0\right)}$$
$$\overline{(\hat{x}_{-i} \cos \theta_0 + \hat{y}_{-i} \sin \theta_0)} \quad (37)$$

Since values $\hat{x}_{-i}$ and $\hat{y}_{-i}$ are assumed to be random values, only the terms $\overline{\hat{x}_{-i} \hat{x}_{-i}}$ and $\overline{\hat{y}_{-i} \hat{y}_{-i}}$ in the second part of expression (37) are different from zero.

If it is further assumed that $$\overline{\hat{x}_{-i} \hat{x}_{-i}} = \overline{\hat{y}_{-i} \hat{y}_{-i}} = K,$$

where K is a positive constant, expression (37) reduces to $$\frac{\overline{(dx_0 \sin \theta_0 - dy_0 \cos \theta_0)(\hat{x}_{-i} \cos \theta_0 + \hat{y}_{-i} \sin \theta_0)}}{dD_i} = -K \quad (38)$$

Similarly, we can ascertain that $$\frac{\overline{(dx_0 \sin \theta_0 - dy_0 \cos \theta_0)(\hat{x}_{-i} \sin \theta_0 - \hat{y}_{-i} \cos \theta_0)}}{dC_i} = -K \quad (39)$$

From expressions (5) and (6), we can write $$dx_0 = -\sin \alpha_0 \, d\alpha_0 \quad (40)$$
$$dy_0 = \cos \alpha_0 \, d\alpha_0 \quad (41)$$

If it is assumed that no detection errors have occurred, that is, if $\alpha_0 = \hat{\alpha}_0$, then expressions (40) and (41) can be written as $$dx_0 = -\sin \hat{\alpha}_0 \, d\alpha_0$$
$$dy_0 = \cos \hat{\alpha}_0 \, d\alpha_0$$

Expressions (38) and (39) then become $$K/dD_i = \overline{(\hat{x}_{-i} \cos \theta_0 + \hat{y}_{-i} \sin \theta_0) \cos(\theta_0 - \hat{\alpha}_0) \, d\alpha_0} \quad (42)$$

$$i \, K/dC_i = \overline{(\hat{x}_{-i} \sin \theta_0 - \hat{y}_{-i} \cos \theta_0) \cos(\theta_0 - \hat{\alpha}_0) \, d\alpha_0} \quad (43)$$

Quantities $dC_i$ and $dD_i$, which represent the errors associated with the values of coefficients $C_i$ and $D_i$, also represent the quantities by which the values of these coefficients are to be varied to obtain a perfect adjustment thereof.

Expressions (42) and (43) determine the weighting coefficient adjustment procedure. The values of $dC_i$ and $dD_i$ can be directly obtained from (43) and (42). All that is required to do so is to provide, in a conventional manner, means for supplying the difference $(\theta_0 - \hat{\alpha}_0)$, conversion means for obtaining $\cos(\theta_0 - \hat{\alpha}_0)$, means for determining the value of $d\alpha_0$ from the expressions $d\alpha_0 = \tilde{\alpha}_0 - \hat{\alpha}_0$, a set of multipliers and adders arranged in such a way as to supply the products of the terms written under the horizontal bars in expressions (42) and (43), two digital integrators for providing the time average of said products, and means for varying the values of $C_i$ and $D_i$ in accordance with the values of $dC_i$ and $dD_i$.

In practice, the so-called zero-forcing approach will be used. This approach, which consists in considering only the signs of the terms in expressions (42) and (43), is described and discussed in the following articles:

"Technique for Adaptive Equalization of Digital Communication System," by R. W. Lucky, in the Bell System Technical Journal, February, 1966, Section IV, pages 255–286, and "A Simple Adaptive Equalizer for Efficient Data Transmission," by D. Hirsch and W. J. Wolf, in Wescon Technical Papers, Part IV, 1969.

This approach involves varying the values of $C_i$ and $D_i$ as a function only of the sign of the quantities $dC_i$ and $dD_i$.

From expressions (42) and (43), $$\text{Sign } (dD_i) = \overline{\text{sign } (\hat{x}_{-i} \cos \theta_0 + \hat{y}_{-i} \sin \theta_0) \text{ sign } [\cos (\theta_0 - \hat{\alpha}_0)] \text{ sign } (d\alpha_0)} \quad (44)$$

and $$\text{Sign } (dC_i) = \overline{\text{sign } (\hat{x}_{-i} \sin \theta_0 - \hat{y}_{-i} \cos \theta_0) \text{ sign } [\cos (\theta_0 - \hat{\alpha}_0)] \text{ sign } (d\alpha_0)} \quad (45)$$

It is convenient to use "sign $[d(D_i + C_i)]$" and "sign $[d(D_i - C_i)]$" instead of "sign $(dD_i)$" and "sign $(dC_i)$". We have $$\text{Sign } [d(D_i + C_i)] = \overline{\text{sign } [\cos (\theta_0 - \hat{\alpha}_0)] \text{ sign } [(\hat{x}_{-i} - \hat{y}_{-i}) \cos \theta_0 + (\hat{x}_{-i} + \hat{y}_{-i}) \sin \theta_0] \text{ sign } (d\alpha_0)} \quad (46)$$

and $$\text{Sign } [d(D_i - C_i)] = \overline{\text{sign } [\cos (\theta_0 - \hat{\alpha}_0)] \text{ sign } [(\hat{x}_{-i} + \hat{y}_{-i}) \cos \theta_0 + (\hat{y}_{-i} - \hat{x}_{-i}) \sin \theta_0] \text{ sign } (d\alpha_0)} \quad (47)$$

In practice, we have $-\pi/2 < \theta_0 - \hat{\alpha}_0 < +\pi/2$ and the sign of $\cos (\theta_0 - \hat{\alpha}_0)$ is positive.

Expressions (46) and (47) then reduce to $$\text{Sign } [d(D_i + C_i)] = \overline{\text{sign } [(\hat{x}_{-i} - \hat{y}_{-i}) \cos \theta_0 + (\hat{x}_{-i} + \hat{y}_{-i}) \sin \theta_0] \text{ sign } (d\alpha_0)} \quad (48)$$

and $$\text{Sign } [d(D_i - C_i)] = \overline{\text{sign } [(\hat{x}_{-i} + \hat{y}_{-i}) \cos \theta_0 + (\hat{y}_{-i} - \hat{x}_{-i}) \sin \theta_0] \text{ sign } (d\alpha_0)} \quad (49)$$

Expressions (48) and (49) define the weighting coefficient adjustment procedure based upon the zero-forcing approach.

Figure 7:
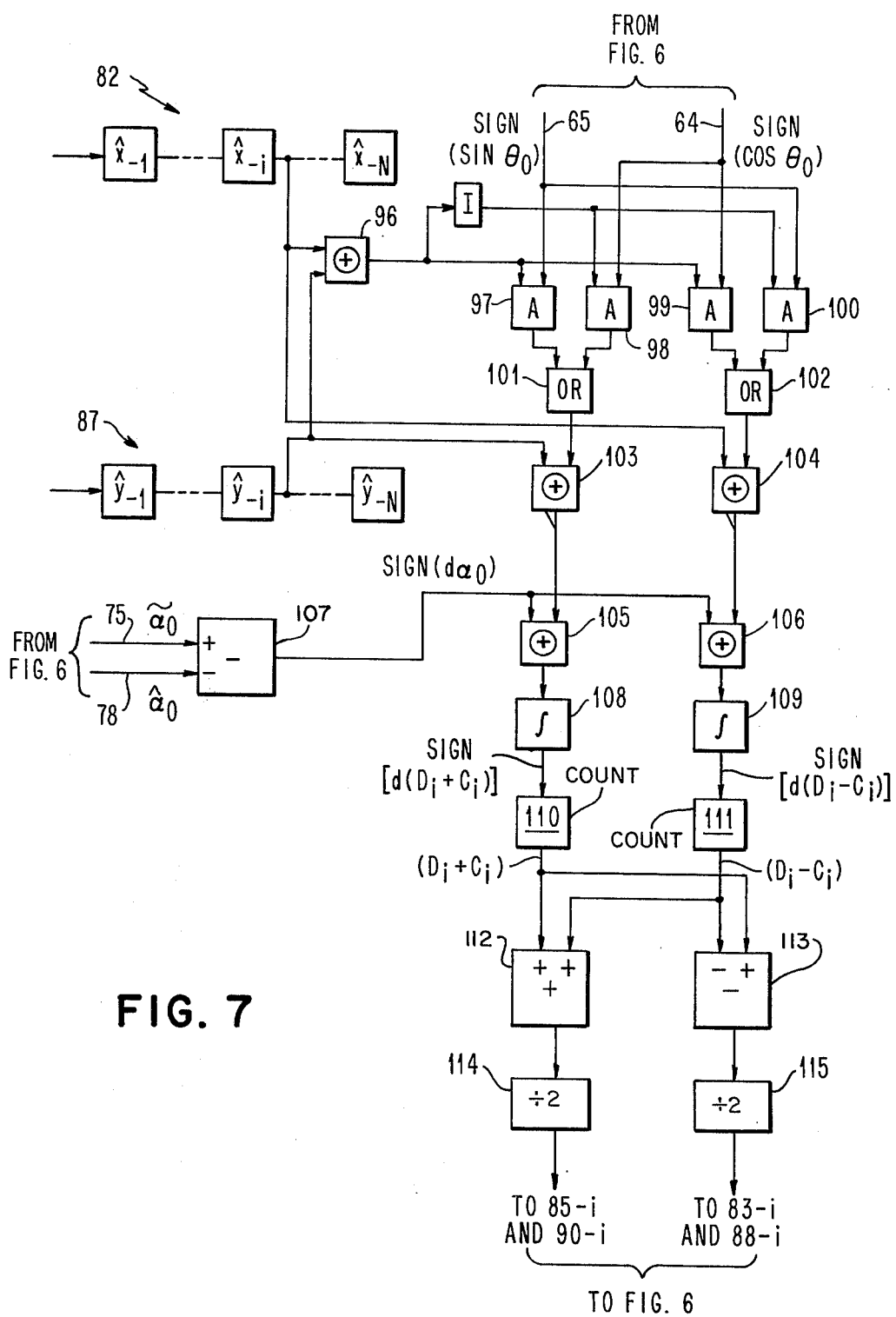
FIG. 7 represents the means used to adjust the values of the weighting coefficients of the proposed equalizer.

Referring now to FIG. 7, there is shown by way of example an embodiment of the weighting coefficient adjustment means alluded to above which use the zero-forcing approach defined by expressions (48) and (49). To simplify the following description of this embodiment, it will be again assumed that the phase of the transmitted signal can assume four distinct values and that $\hat{x}_{-i}, \hat{y}_{-i} = \pm 1$; for the same reason, only those circuits which are associated with the adjustment of one pair of coefficients, such as $C_1, D_1$, have been shown in FIG. 7. The fact that $\hat{x}_{-i}, \hat{y}_{-i} = \pm 1$ modifies expressions (48) and (49).

If $\hat{x}_{-i} - \hat{y}_{-i} = 0$, we have $$\text{Sign } [(\hat{x}_{-i} - \hat{y}_{-i}) \cos \theta_0 + (\hat{x}_{-i} + \hat{y}_{-i}) \sin \theta_0] \text{ sign } (d\alpha_0)$$
$$= \text{sign } (\hat{x}_{-i}) \text{ sign } (\sin \theta_0) \text{ sign } (d\alpha_0) \quad (50)$$

and $$\text{Sign } [(\hat{x}_{-i} + \hat{y}_{-i}) \cos \theta_0 + (\hat{y}_{-i} - \hat{x}_{-i}) \sin \theta_0] \text{ sign } (d\alpha_0)$$
$$= \text{sign } (\hat{y}_{-i}) \text{ sign } (\cos \theta_0) \text{ sign } (d\alpha_0) \quad (51)$$

If $\hat{x}_{-i} + \hat{y}_{-i} = 0$, we have $$\text{Sign } [(\hat{x}_{-i} - \hat{y}_{-i}) \cos \theta_0 + (\hat{x}_{-i} + \hat{y}_{-i}) \sin \theta_0] \text{ sign } (d\alpha_0)$$
$$= \text{sign } (\hat{x}_{-i}) \text{ sign } (\cos \theta_0) \text{ sign } (d\alpha_0) \quad (52)$$

and Sign $[(\hat{x}_{-i} + \hat{y}_{-i}) \cos \theta_0 + (\hat{y}_{-i} - \hat{x}_{-i}) \sin \theta_0]$ sign $(d\alpha_0) = \text{sign } (\hat{y}_{-i}) \text{ sign } (\sin \theta_0) \text{ sign } (d\alpha_0) \quad (53)$ Means capable of providing "sign $[d(D_i + C_i)]$" and "sign $[d(D_i - C_i)]$" as defined by expressions (48) and (49), respectively, using expressions (50) – (53), will now be described.

The $i^{th}$ taps of each of delay lines 82 and 87 are respectively connected to the inputs of an Exclusive OR circuit 96 the output of which is directly connected to the first input of each of a pair of AND gates 97 and 99. The output of Exclusive OR circuit 96 is also connected through an inverter I to the first input of each of a pair of AND gates 98 and 100. The second inputs of AND gates 97 and 100 are connected to line 65 (FIG. 6) while the second inputs of AND gates 98 and 99 are connected to line 64 (FIG. 6). The outputs of AND gates 97 and 98 are connected to the inputs of an OR circuit 101. The outputs of AND gates 99 and 100 are connected to the inputs of an OR circuit 102. The output of OR circuit 101 is connected to one of the inputs of an Exclusive OR-Invert circuit 103 the other input of which is connected to the $i^{th}$ tap of delay line 87. The output of OR circuit 102 is connected to one of the inputs of an Exclusive OR-Invert circuit 104 the other input of which is connected to the $i^{th}$ tap of delay line 82. The outputs of circuits 103 and 104 are respectively connected to a first input of each of a couple of Exclusive OR circuits 105 and 106, the second inputs of which are connected to the output of binary subtractor 107, the (+) and (−) inputs of which are in turn connected to lines 75 and 78, see FIG. 6, respectively. The outputs of Exclusive OR's 105 and 106 are respectively connected to the input of a couple of digital integrators 108 and 109 which, in the preferred embodiment, consist of two reversible binary counters. The outputs of digital integrators 108 and 109 are respectively connected to the inputs of two reversible counters 110 and 111. The output of counter 110 is connected to one of the two (+) inputs of a binary adder 112 the other (+) input of which is connected to the output of counter 111. The output of counter 111 is also connected to the (−) input of a binary subtractor 113 the (+) input of which is connected to the output of counter 110. The outputs of devices 112 and 113 are respectively connected to the inputs of a couple of divide-by-two devices 114 and 115. The output of device 114 is connected to the second input of each of multipliers 85-$i$ and 90-$i$ (FIG. 6), and the output of device 115 is connected to the second input of each of multipliers 83-$i$ and 88-$i$ (FIG. 6). In practice, each of the devices 114, 115 simply consists of a binary register. The divide-by-two operation is performed by conventionally shifting the contents of the register one position toward the lower-order bits.

In operation the circuits shown in FIG. 7 will now be described. The estimated values $\hat{x}_{-i}$ and $\hat{y}_{-i}$ respectively available at the $i^{th}$ taps of delay lines 82 and 87 are compared in Exclusive OR circuit 96. It is assumed that the +1 and −1 values of $\hat{x}_{-i}$ and $\hat{y}_{-i}$ are respectively represented by the presence of an up level and a down level at the taps.

If $\hat{x}_{-i} - \hat{y}_{-i} = 0$, the output of Exclusive OR circuit 96 is at a down level so that AND gates 97 and 99 are in a non-conductive state while AND gates 98 and 100 are in a conductive state. The sign $(\cos \theta_0)$ information available on line 64 is supplied to an input of Exclusive Or-Invert circuit 103 through AND gate 98 and OR circuit 101. It is assumed that the sign $(\cos \theta_0)$ information is at a down level or at an up level depending on whether the sign of $\cos \theta_0$ is positive or negative. Circuit 103, the other input of which receives the sign $(\hat{y}_{-i})$ information, that is, an up level or a down level depending on whether $\hat{y}_{-i} = +1$ or $-1$, supplies the product sign $(\hat{y}_{-i})$ sign $(\cos \theta_0)$". The sign of this product is represented by a down level or by an up level depending on whether it is positive or negative. The sign $(d\alpha_0)$ information is obtained at the sign output of subtractor 107, the (+) and (−) inputs of which receive value $\tilde{\alpha}_0$ and $\alpha_0$, respectively. Subtractor 107 calculates the difference $(\tilde{\alpha}_0 - \alpha_0)$ which is assumed to be equal to $d\alpha_0$. Conventionally, the sign output of subtractor 107 will be at a down level or at an up level depending on whether said difference is positive or negative. The product sign $(\hat{y}_{-i})$ sign $(\cos \theta_0)$ and the sign $(d\alpha_0)$ information are multiplied together in Exclusive OR circuit 105 which provides the product sign $(\hat{y}_{-i})$ sign $(\cos \theta_0)$ sign $(d\alpha_0)$.

The latter product is fed to digital integrator 108 which supplies the sign $[d(D_i+C_i)]$ information in accordance with expressions (48) and (50). This information is used to update the value of $(D_i+C_i)$ stored in reversible counter 110. Similarly, the sign $[d(D_i-D_i)]$ information is provided by integrator 109 and serves to update the value of $(D_i-C_i)$ stored in reversible counter 111.

If $\hat{x}_{-i} + \hat{x}_{-i} = 0$, sign $[d(D_i+C_i)]$ and sign $[d(D_i-C_i)]$ will respectively be obtained, as before, at the output of digital integrators 108 and 109, but this result will be achieved using expressions (52) and (53). Quantities $(D_i+C_i)$ and $(D_i-C_i)$ respectively stored in counters 110 and 111 are respectively provided to the inputs of adder 112, which supplies quantity $2D_i$. Quantity $2D_i$ is provided to the input of divide-by-two device 114 which supplies the value of weighting coefficient $D_i$, which is in turn applied to the second input of multipliers $85_{-i}$ and $89_{-i}$. Quantities $(D_i+C_i)$ and $(D_i-C_i)$ are also provided to the (+) and (−) inputs of subtractor 113 which supplies output quantity $2C_i$. The latter quantity is applied to the input of divide-by-two device 115 which provides the value of weighting coefficient $c_i$, which value is provided to the second input of each of multipliers 83-$i$ and 88-$i$.

As previously mentioned, FIG. 7 only shows the adjustment circuits associated with a single pair of coefficients $C_i$ and $D_i$. In practice, the values of all coefficients would be simultaneously updated, and the number of circuits of the type illustrated in FIG. 7 that would be required would be equivalent to the number of pairs of coefficients; alternatively, the circuits shown in FIG. 7 could be multiplexed in time to successively update the values of the pairs of coefficients.

Referring now to FIG. 8, there is shown by way of example a digital embodiment of the decision logic 74 schematically represented in FIG. 6. For simplicity, it will be assumed in the following description of decision logic 74 that the phase of the transmitted signal can assume one of four distinct values $\alpha_j$, with $j = 1, 2, 3, 4$, called reference values, at each sampling time. As has been explained, the basic function of decision logic 74 is to compare the approximate value $\tilde{\alpha}_0$ supplied by subtractor 71 with each of the values $\alpha_j$ and to select the value that is closest to $\hat{\alpha}_0$. The selected value represents an estimate $\hat{\alpha}_0$ of the value $\alpha_0$ of the phase of the transmitted signal. Value $\tilde{\alpha}_0$ is applied via line 73 to the (+) input of a binary subtractor 116 the (−) input of which successively receives via line 117 the values $\alpha_j$, with $j = 1, 2, 3$, and 4, stored in memory 118. Subtractor 116 successively provides the quantities $\delta_j = \overline{\hat{\alpha}_0 - \alpha_j}$, with $j = 1, 2, 3$, and 4, the bars indicating that the quantities $\delta_j$ represent the absolute value of the differences $(\tilde{\alpha}_0 - \alpha_j)$. The quantities $\delta_1, \delta_2, \delta_3$ and $\delta_4$ are successively provided to the input of a delay line 119 comprising three cells, each of which introduces a $\tau$-sec delay equal to the time interval between the occurrence of two successive quantities $\delta_j$ at the output of subtractor 116. Delay line 119 has four taps with a $\delta$-sec spacing. The first tap, which is located at the output of delay line 119, is connected to the (+) inputs of three binary subtractors 120, 121, 122, the (−) inputs of which are respectively connected to the second, third and fourth taps of delay line 119. The second and third taps are also connected to the (+) and (−) inputs, respectively, of a binary subtractor 123. In addition, the second and fourth taps are respectively connected to the (+) and (−) inputs of a binary subtractor 123, while the third and fourth taps are respectively connected to the (+) and (−) inputs of a binary subtractor 125. The outputs of subtractors 120, 121, and 122 are respectively connected to the three inputs of an AND gate 126. The output of subtractor 120 is also connected through an inverter 1 to one of the inputs of an AND gate 127, the other two inputs of which are respectively connected to the outputs of subtractors 123 and 124. The outputs of subtractors 121 and 123 are respectively connected through a pair of inverters 1 to two of the inputs of an AND gate 128, the third input of which is directly connected to the output of subtractor 125. The outputs of subtractors 122, 124 and 125 are respectively connected through three inverters 1 to the three inputs of an AND gate 129. The output of memory 118 is also connected via line 130 to the input of a tapped delay line 131 identical to delay line 119. The first, second, third, and fourth taps of delay line 131, the first tap being located at the output of delay line 131, are respectively connected to the first input of each of four AND gates 132, 133, 134 and 135. The outputs of AND gates 126–129 are respectively connected to the second input of each of AND gates 132–135. The outputs of all four AND gates 132–135 are connected to the four inputs of an OR circuit 136, the output of which represents the output of decision logic 74 and is connected to line 76 (FIG. 6).

The operation of the decision logic 74 illustrated in FIG. 8 will not be described. As previously mentioned, the quantities $\delta_1, \delta_2, \delta_3$ and $\delta_4$ successively provided by subtractor 116 are applied to the input of delay line 119. The outputs of AND gates 126–129 are inhibited by conventional means (not shown) until the first quantity $\delta_1$ becomes available at the output of delay line 119, at which time quantities $\delta_2$, $\delta_3$ and $\delta_4$ are respectively available at the second, third, and fourth taps. Because of the connections which, as explained above, exist between the taps of delay line 119 and the inputs of subtractors 120-125, the latter circuits supply the differences $\delta_1-\delta_2$, $\delta_1-\delta_3$, $\delta_1-\delta_4$, $\delta_2-\delta_3$, $\delta_2-\delta_4$, $\delta_3-\delta_4$, respectively. Actually, only the sign outputs of the subtractors are used, and it is assumed that each sign output provides a 1 bit or a 0 bit depending on whether the sign of the differences $\delta_1-\delta_2$, $\delta_1-\delta_3$ and $\delta_1-\delta_4$ are negative, this means that $\alpha_1$ is minimal and that $\alpha_1$ is the reference value which is closest to value $\tilde{\alpha}_0$. A 1 bit then appears at the outputs of subtractors 121-123 and of AND 126. Thus, a 1 bit appearing at the output of AND gate 126 means that $\alpha_1$ is the reference value that is closest to the phase value $\alpha$. Similarly, it will be seen that the presence of 1 bit at the output of AND gate 127, 128 or 129, means that $\alpha_2$, $\alpha_3$ or $\alpha_4$ is the reference phase value that is closest to phase value $\alpha$. It will also be seen that only one of AND gates 126-129 supplies a 1 bit at a given instant. Reference phase values $\alpha_1$, $\alpha_2$, $\alpha_3$ and $\alpha_4$ are applied to the input of delay line 131 at the same time as differences $\alpha_1$, $\alpha_2$, $\alpha_3$, and $\alpha_4$ are provided to the input of delay line 113. As before, it will be assumed that the outputs of AND gates -135 are inhibited until $\alpha_1$ becomes available at the first tap of delay line 131. When $\alpha_1$ is available at the first tap, $\alpha_2$, $\alpha_3$, and $\alpha_4$ are respectively available at the second, third and fourth taps of delay line 131. At this time, assuming that $\delta_3$ is minimal, i.e., that $\alpha_3$ is the reference value closest to $\tilde{\alpha}_0$, a 1 bit appears at the output of AND gate 128 and enables gate 134, thereby causing the value of $\alpha_3$ available at the third tap of delay line 131 to be transferred to line 76 through OR circuit 136. Thus, an estimated value $\hat{\alpha}_0$ of the phase of the signal transmitted at sampling time $t_0$ is obtained on line 76.

It should be noted that the principle used by the decision logic 76 of FIG. 8 holds true regardless of the number of reference values $\alpha_j$.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. In a digital data communication system using the digital phase modulation technique, a method for equalizing a communication channel which introduces phase and amplitude distortions such that at any given instant a received signal is the sum of a transmitted signal and a distorting signal representative of the sum of said phase and amplitude distortions, said method including the steps of:

determining the value $\theta_0$ of the phase of the received signal at a sampling time $t_0$, converting said phase value $\theta_0$ into the trigonometric functions $\cos \theta_0$ and $\sin \theta_0$, measuring approximate values $\tilde{\Delta u}$ and $\tilde{\Delta v}$ of said distorting signal in said received signal, deriving a phase error signal, $(\theta_0 - \tilde{\alpha}_0)$, said phase error signal $(\theta_0 - \tilde{\alpha}_0)$ being defined as $(\theta_0 - \tilde{\alpha}_0) = \arcsin (\tilde{\Delta v}_0 \cos \theta_0 - \tilde{\Delta u}_0 \sin \theta_0)$ subtracting said phase error signal from said value $\theta_0$ to provide an approximate value $\tilde{\alpha}_0$ of the phase of the signal as transmitted and using said approximate value $\tilde{\alpha}_0$ to select a discrete value $\hat{\alpha}_0$ as the probable value of the phase of the signal transmitted at sampling time $t_0$.

2. An equalization method as set out in claim 1, characterized in that the approximate values $\tilde{\Delta u}_0$ and $\tilde{\Delta v}_0$ of the components of said distorting signal are determined by the steps of:

converting the estimated value $\alpha_0$ of the phase of the signal transmitted at sampling time $t_0$ into its components $\hat{x}_0$ and $\hat{y}_0$ in a Cartesian coordinates system, and applying components $\hat{x}_0$ and $\hat{y}_0$ to the input of a complex cross-coupled equalizer providing approximate values $\tilde{\Delta u}_0$ and $\tilde{\Delta v}_0$ in accordance with the relations $$\tilde{\Delta u}_0 = \hat{x}_{-1} C_1 + \hat{y}_{-1} D_1 + \ldots + \hat{x}_{-i} C_i + \hat{y}_{-i} D_i + \ldots + \hat{x}_{-N} C_N + \hat{y}_{-N} D_N$$

$$\tilde{\Delta v}_0 = \hat{y}_{-1} C_1 - \hat{x}_{-1} D_1 + \ldots + \hat{y}_{-i} C_i - \hat{x}_{-i} D_i + \ldots + \hat{y}_{-N} C_N - \hat{x}_{-N} D_N$$

where $\hat{x}_{-1}, \ldots, \hat{x}_{-N}$ and $\hat{y}_{-1}, \ldots, \hat{y}_{-N}$ are the components of the estimated phase values of the signal transmitted at the $N$ preceding sampling times, and where $C_i$ and $D_i$, with $i=1, \ldots, N$, are weighting coefficients.

3. A method as set out in claim 2, in which the values of the weighting coefficients $C_i$ and $D_i$ of the complex cross-coupled equalizer are adjusted to values which cause the approximate value $\tilde{\alpha}_0$ to be as close as possible to the value $\hat{\alpha}_0$ selected as the phase of the transmitted signal which is received at sampling time $t_0$.

4. A method as set out in claim 3, in which the values of weighting coefficients $C_i$ and $D_i$, with $i=1, \ldots, N$, are adjusted by incrementing or decrementing said values by quantities $dC_i$ and $dD_i$, said quantities being defined as the time average of $$(\hat{x}_{-i} \cos \theta_0 + \hat{y}_{-i} \sin \theta_0) \cos (\theta_0 - \hat{\alpha}_0) \, d\alpha_0$$

for $kdD_i$ and the timed average of $$(\hat{x}_{-i} \sin \theta_0 - \hat{y}_{-i} \cos \theta_0) \cos (\theta_0 - \hat{\alpha}_0) \, d\alpha_0$$

for $KdC_i$ where $d\alpha_0$ is the error associated with the signal for which the value $\hat{\alpha}_0$ is selected as the phase of the transmitted signal which is received at sampling time $t_0$, and $K$ is a positive constant.

5. A method as set out in claim 3, characterized in that the values of said weighting coefficients $C_i$ and $D_i$ are adjusted by incrementing or decrementing the same in accordance with combinations of the signs of quantities $dC_i$ and $dD_i$, said increments being determined as the time average of sign sign $(d\alpha_0)$ for the sign of and the time average of sign sign $(d\alpha_0)$ for the sign of where $d\alpha_0$ is the error associated with the signal for which the value $\hat{\alpha}_0$ is selected as the phase of the transmitted signal which is received at sampling time $t_0$.

6. A decision feedback equalizer for a communication channel which introduces phase and amplitude distortion, said equalizer comprising:

input means for receiving the value $\theta_0$ of the phase of a sample of the signal received at a sampling time $t_0$, a computing unit receiving as inputs the values $\theta_0$, $\tilde{\Delta}u_0$, $\tilde{\Delta}v_0$ and supplying the quantity $\sin(\theta_0 - \tilde{\alpha}_0)$ defined as $$\sin(\theta_0 - \tilde{\alpha}_0) = \tilde{\Delta}v_0 \cos\theta_0 - \tilde{\Delta}u_0 \sin\theta_0$$

wherein the factors $\tilde{\Delta}u_0$ and $\tilde{\Delta}v_0$ are the approximate components of a signal effectively equivalent to said distortions and $\tilde{\alpha}_0$ is an approximation of the value of the phase of the signal sample, a first conversion means for receiving and converting said $\sin(\theta_0-\tilde{\alpha}_0)$ quantity to the value $(\theta_0-\tilde{\alpha}_0)$, a subtraction means receiving said value $\theta_0$ from said input means and for receiving said $(\theta_0-\tilde{\alpha}_0)$ value from said first conversion means for subtracting from the value $\theta_0$ the phase error $(\theta_0-\tilde{\alpha}_0)$ and for providing on an output terminal the approximate value $\tilde{\alpha}_0$, a decision means connected to said subtraction means for supplying the values $\hat{x}_0$ and $\hat{y}_0$ of the components in a Cartesian coordinates system of an estimated value $\hat{\alpha}_0$ of the phase of the signal transmitted at sampling time $t_0$, said value $\hat{\alpha}_0$ being obtained in said decision means from the approximate value $\tilde{\alpha}_0$, and a complex cross-coupled equalizer receiving from said decision means the values $\hat{x}_0$ and $\hat{y}_0$, as input signals, and supplying to said computing unit said approximate values $\tilde{\Delta}u_0$ and $\tilde{\Delta}v_0$ as the components of the equivalent distorting signal.

7. An equalizer as set out in claim 6 in which said complex cross-coupled equalizer includes:

a first delay line of N sections and including N taps with a T-sec. spacing, where T is the sampling rate, and connected to said decision means for receiving the value $\hat{x}_0$ as an input signal, a first set of N multipliers the first inputs of which are respectively connected to the N taps of said first delay line and the second inputs of which are connected to receive the values of N weighting coefficients $C_1$, ..., $C_i$, ..., $C_N$, respectively, a first summing device having N inputs which are respectively connected to the outputs of the N multipliers of said first set of multipliers, a second set of N multipliers the first inputs of which are respectively connected to the N taps of said first delay line and the second inputs of which are connected to receive the values of N weighting coefficients $D_1$, ..., $D_i$, ..., $D_N$, respectively, a second summing device having N inputs which are respectively connected to the outputs of the N multipliers of said second set of multipliers, a second delay line of N sections and including N taps with a T-sec. spacing, said second delay line being connected to said decision means for receiving the value $y_0$ as an input signal, a third set of N multipliers the first inputs of which are respectively connected to the N taps of said second delay line, and the second inputs of which are connected to receive the values of weighting coefficients $C_1$, ..., $C_i$, ..., $C_N$, respectively, a third summing device having N inputs which are respectively connected to the outputs of the N multipliers of said third set of multipliers, a fourth set of N multipliers the first inputs of which are respectively connected to the N taps of said second delay line and the second inputs of which are connected to receive the values of the N weighting coefficients $D_1$, ..., $D_i$, ..., $D_N$, respectively, a fourth summing device having N inputs which are respectively connected to the outputs of the N multipliers of said fourth set of multipliers, an adder having its inputs connected to the outputs of said first and fourth summing devices, and the output of which is said value $\tilde{\Delta}u_0$, and a subtractor having its (+) and (−) inputs respectivley connected to the outputs of said third and second summing devices, and the output of which is said value $\tilde{\Delta}v_0$.

8. An equalizer as set out in claim 7 and in which said decision means includes:

a decision logic for providing from the approximate value $\tilde{\alpha}_0$, an estimated value $\hat{\alpha}_0$ of a group of values representing possible values of the phase of the signal received at the sampling time $t_0$, and decoding means for supplying the values $\hat{x}_0$ and $\hat{y}_0$ of the components in a Cartesian coordinates system of the estimated value $\hat{\alpha}_0$.

9. An equalizer as set out in claim 7 and which includes means for adjusting the values of weighting coefficients $C_i$ and $D_i$, with $i=1, ..., N$, by respectively altering previously set ones of the same by the quantities $dC_i$ and $dD_i$, said quantities being defined as the time average of the quantity $$(\hat{x}_{-i}\cos\theta_0 + \hat{y}_{-i}\sin\theta_0)\cos(\theta_0 - \hat{\alpha}_0)\, d\alpha_0$$

for the term $KdD_i$ and the time average of the quantity $$(\hat{x}_{-i}\sin\theta_0 - \hat{y}_{-i}\cos\theta_0)\cos(\theta_0 - \hat{\alpha}_0)\, d\alpha_0$$

for the term $KdC_i$, where $d\alpha_0$ is the error associated with the value $\alpha_0$ of the phase of the transmitted signal, and K is a positive constant.

10. An equalizer as described in claim 8, characterized in that said equalizer includes means for adjusting the value of each said weighting coefficients $C_i$ and $D_i$, with $i=1, ..., N$, by incrementing same in accordance with the signs of quantities $dC_i$ and $dD_i$ as defined by the time average of the expression $$\text{sign}\,[(\hat{x}_{-i}-\hat{y}_{-i})\cos\theta_0 + (\hat{x}_{-i}+\hat{y}_{-i})\sin\theta_0]\,\text{sign}\,(d\alpha_0)$$

for the sign of $[d(D_i+C_i)]$ and the time average of expression $$\text{sign}\,[(\hat{x}_{-i}+\hat{y}_{-i})\cos\theta_0 + (\hat{y}_{-i}-\hat{x}_{-i})\sin\theta_0]\,\text{sign}\,(d\alpha_0)$$

for the sign of $[d(D_i-C_i)]$, where $d\alpha_0$ is the error associated with the value $\alpha_0$ of the phase of the transmitted signal.

11. An equalizer as described in claim 10, wherein the phase value of the received signal will approximate one of the four values $\pi/4$, $3\pi/4$, $5\pi/4$ and $7\pi/4$ at each sampling time, characterized in that the means for adjusting the values of weighting coefficients $C_i$ and $D_i$ by varying same in accordance with the signs of quantities $dC_i$ and $dD_i$, calculates the expressions of claim 10 by using the following expressions:

a. if $\hat{x}_{-i} - \hat{y}_{-i} = 0$:

$$\text{sign}\,[(\hat{x}_{-i}-\hat{y}_{-i})\cos\theta_0 + (\hat{x}_{-i}+\hat{y}_{-i})\sin\theta_0]\,\text{sign}\,(d\alpha_0)$$
$$= \text{sign}\,(\hat{x}_{-i})\,\text{sign}\,(\sin\theta_0)\,\text{sign}\,(d\alpha_0)$$

and $$\text{sign } [(\hat{x}_{-i}+\hat{y}_{-i}) \cos \theta_0 + (\hat{y}_{-i}+\hat{x}_{-i}) \sin \theta_0] \text{ sign } (d\alpha_0) =$$
$$\text{sign } (\hat{y}_{-i}) \text{ sign } (\cos \theta_0) \text{ sign } (d\alpha_0)$$

b. if $\hat{x}_{-i} + \hat{y}_{-i} = 0$:

$$\text{sign } [(\hat{x}_{-i}-\hat{y}_{-i}) \cos \theta_0 = (\hat{x}_{-i}+\hat{y}_{-i}) \sin \theta_0] \text{ sign } (d\alpha_0) =$$
$$\text{sign } (\hat{x}_{-i}) \text{ sign } (\cos \theta_0) \text{ sign } (d\alpha_0)$$

and $$\text{sign } [(\hat{x}_{-i}+\hat{y}_{-i}) \cos \theta_0 + (\hat{y}_{-i}-\hat{x}_{-i}) \sin u_0] \text{ sign } (d\alpha_0).$$
$$= \text{sign } (y_{-i}) \text{ sign } (\sin \theta_0) \text{ sign } (d\alpha_0).$$

12. An equalizer as set out in claim 11, characterized in that said computation unit includes:
 a second conversion means for converting $\theta_0$ to $\sin \theta_0$ and $\cos \theta_0$, and
 a computation means for calculating the term $$\sin (\theta_0 - \tilde{\alpha}_0) = \tilde{\Delta}\nu_0 \cos \theta_0 - \tilde{\Delta}u_0 \sin \theta_0.$$

* * * * *

UNITED STATES PATENT AND TRADEMARK OFFICE
CERTIFICATE OF CORRECTION

PATENT NO. : 4,025,719

DATED : May 24, 1977

INVENTOR(S) : Henri Nussbaumer

It is certified that error appears in the above-identified patent and that said Letters Patent are hereby corrected as shown below:

Claim 2, Column 22, line 14, "$\Delta u_0$ and $\Delta v_0$" should be
$-\tilde{\Delta} u_0$ and $\tilde{\Delta} v_0$ --;

Claim 5, Column 22, line 57, delete "sign sign $(d\alpha_0)$" and insert --sign $[(\hat{x}_{-i} - \hat{y}_{-i}) \cos \theta_0 + (\hat{x}_{-i} + \hat{y}_{-i}) \sin \theta_0]$ sign $(d\alpha_0)$--;

Claim 5, Column 22, line 59, after "of" (first occurrence) insert --$[d(D_i + C_i)]$--;

Claim 5, Column 22, line 60, delete "sign sign $(d\alpha_0)$" and insert --sign $[(\hat{x}_{-i} + \hat{y}_{-i}) \cos \theta_0 + (\hat{y}_i - \hat{x}_{-i}) \sin \theta_0]$ sign $(d\alpha_0)$;

UNITED STATES PATENT AND TRADEMARK OFFICE
CERTIFICATE OF CORRECTION

PATENT NO. : 4,025,719

DATED : May 24, 1977

INVENTOR(S) : Henri Nussbaumer

It is certified that error appears in the above-identified patent and that said Letters Patent are hereby corrected as shown below:

Claim 11, Column 25, line 9, change "=" (first occurrence) to --+--;

Claim 11, Column 26, line 3, change "$u_0$" to --$\theta_0$--;

line 4, change "$y_{-i}$" to --$\hat{y}_{-i}$--.

Signed and Sealed this

Sixteenth Day of May 1978

[SEAL]

Attest:

RUTH C. MASON
Attesting Officer

LUTRELLE F. PARKER
Acting Commissioner of Patents and Trademarks